(12) United States Patent
Chujo et al.

(10) Patent No.: US 12,051,327 B2
(45) Date of Patent: Jul. 30, 2024

(54) IN-VEHICLE WIRELESS COMMUNICATION DEVICE, WIRELESS COMMUNICATION SYSTEM, AND WIRELESS COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Makoto Chujo, Yokkaichi (JP); Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 68 days.

(21) Appl. No.: 17/757,873

(22) PCT Filed: Dec. 4, 2020

(86) PCT No.: PCT/JP2020/045233
§ 371 (c)(1),
(2) Date: Jun. 22, 2022

(87) PCT Pub. No.: WO2021/131612
PCT Pub. Date: Jul. 1, 2021

(65) Prior Publication Data
US 2023/0018048 A1  Jan. 19, 2023

(30) Foreign Application Priority Data
Dec. 24, 2019 (JP) .................................. 2019-233529

(51) Int. Cl.
*G08G 1/09* (2006.01)
*G08G 1/0967* (2006.01)
(Continued)

(52) U.S. Cl.
CPC ....... *G08G 1/093* (2013.01); *G08G 1/096716* (2013.01); *H04W 28/06* (2013.01); *H04W 4/44* (2018.02)

(58) Field of Classification Search
CPC ............. G08G 1/093; G08G 1/096716; G08G 1/096783; H04W 28/06; H04W 4/44; H04W 92/18
See application file for complete search history.

(56) References Cited

U.S. PATENT DOCUMENTS 9,872,152 B2 *  1/2018  Kumabe ............... G06F 21/305
10,356,798 B2 *  7/2019  Hu ........................ H04W 72/56
(Continued)

FOREIGN PATENT DOCUMENTS

| JP | 2013-179539 A | 9/2013 |
| JP | 2014-192561 A | 10/2014 |
| JP | 2019-028000 A | 2/2019 |

OTHER PUBLICATIONS

International Search Report, Application No. PCT/JP2020/045233, mailed Feb. 2, 2021.

*Primary Examiner* — John A Tweel, Jr.
(74) *Attorney, Agent, or Firm* — Honigman LLP

(57) ABSTRACT

An in-vehicle wireless communication device according to the present embodiment is mounted in a vehicle and includes a wireless communication unit that performs wireless communication with an external device provided outside of the vehicle and a processing unit that performs processing relating to communication, in which the processing unit determines a communication amount in an in-vehicle network provided inside of the vehicle, transmits communica- (Continued)

tion amount information relating to the determined communication amount to the external device by the wireless communication unit, and receives data transmitted from the external device at a size corresponding to the transmitted communication amount information, by the wireless communication unit.

8 Claims, 17 Drawing Sheets

(51) Int. Cl.
*H04W 4/44* (2018.01)
*H04W 28/06* (2009.01)

(56) References Cited

U.S. PATENT DOCUMENTS

| | | | |
|---|---|---|---|
| 10,917,808 B2* | 2/2021 | Nagamura | H04W 4/40 |
| 2012/0094606 A1* | 4/2012 | Sakata | H04W 4/06 |
| | | | 455/39 |
| 2023/0136285 A1* | 5/2023 | Chujo | H04W 28/12 |
| | | | 370/329 |

* cited by examiner

LEGEND
A= Transmission amount information
B= Communication amount

LEGEND
A= Communication amount

IN-VEHICLE WIRELESS COMMUNICATION DEVICE, WIRELESS COMMUNICATION SYSTEM, AND WIRELESS COMMUNICATION METHOD

CROSS-REFERENCE TO RELATED APPLICATIONS

This application is the U.S. national stage of PCT/JP2020/045233 filed on Dec. 4, 2020, which claims priority of Japanese Patent Application No. JP 2019-233529 filed on Dec. 24, 2019, the contents of which are incorporated herein.

TECHNICAL FIELD

The present disclosure relates to an in-vehicle wireless communication device, a wireless communication system, and a wireless communication method for performing road-vehicle wireless communication.

BACKGROUND

Conventionally, a road-vehicle wireless communication system that provides various types of information by wireless signals from a roadside wireless communication device installed on a road to an in-vehicle wireless communication device mounted in a vehicle has been put into practical use. The information transmitted from the roadside wireless communication device to the in-vehicle wireless communication device can be, for example, information such as the lighting state of a traffic signal and traffic information in the surrounding area, and in a vehicle that has received these pieces of information, for example, it is possible to perform processing such as alerting the driver of the vehicle or performing driving assistance control of the vehicle.

JP 2019-28000A proposes a travel assistance device that acquires position information of vehicles in the surrounding area through wireless communication with an infrastructure unit and other vehicles, and detects traffic congestion of the road caused by branching of the road, based on the acquired position information and the shape of the road.

In recent years, services provided by vehicles have become more sophisticated and diversified, and the amount of data that is handled in order to provide the services has increased. In the future, it is expected that various services using road-vehicle wireless communication will start to be provided, and thus there is a risk that the amount of data transmitted and received on a network inside the vehicle and the amount of data transmitted and received between the road and vehicles will increase.

The present disclosure has been made in view of such circumstances, and an object thereof is to provide an in-vehicle wireless communication device, a wireless communication system, and a wireless communication method that can be expected to suppress an increase in the amount of data transmitted and received through road-vehicle wireless communication.

SUMMARY

An in-vehicle wireless communication device according to this aspect is an in-vehicle wireless communication device that is mounted in a vehicle and includes a wireless communication unit for performing wireless communication with an external device installed outside of the vehicle and a processing unit for performing processing relating to communication, in which the processing unit determines a communication amount in an in-vehicle network provided inside of the vehicle, transmits communication amount information relating to the determined communication amount to the external device by the wireless communication unit, and receives data transmitted from the external device at a size corresponding to the transmitted communication amount information, by the wireless communication unit.

The present application can be realized not only as a device such as an in-vehicle wireless communication device including such a characteristic processing unit, but can also be realized as a method of performing the characteristic processing as a step, or can be realized as a computer program for causing a computer to execute the step. It can be realized as a semiconductor integrated circuit that realizes some or all of these devices, or can be realized as another device or system including these devices.

Advantageous Effects

According to the description above, it can be expected that an increase in the amount of data transmitted and received through road-vehicle wireless communication will be suppressed.

DETAILED DESCRIPTION OF PREFERRED EMBODIMENTS

Figure 1:
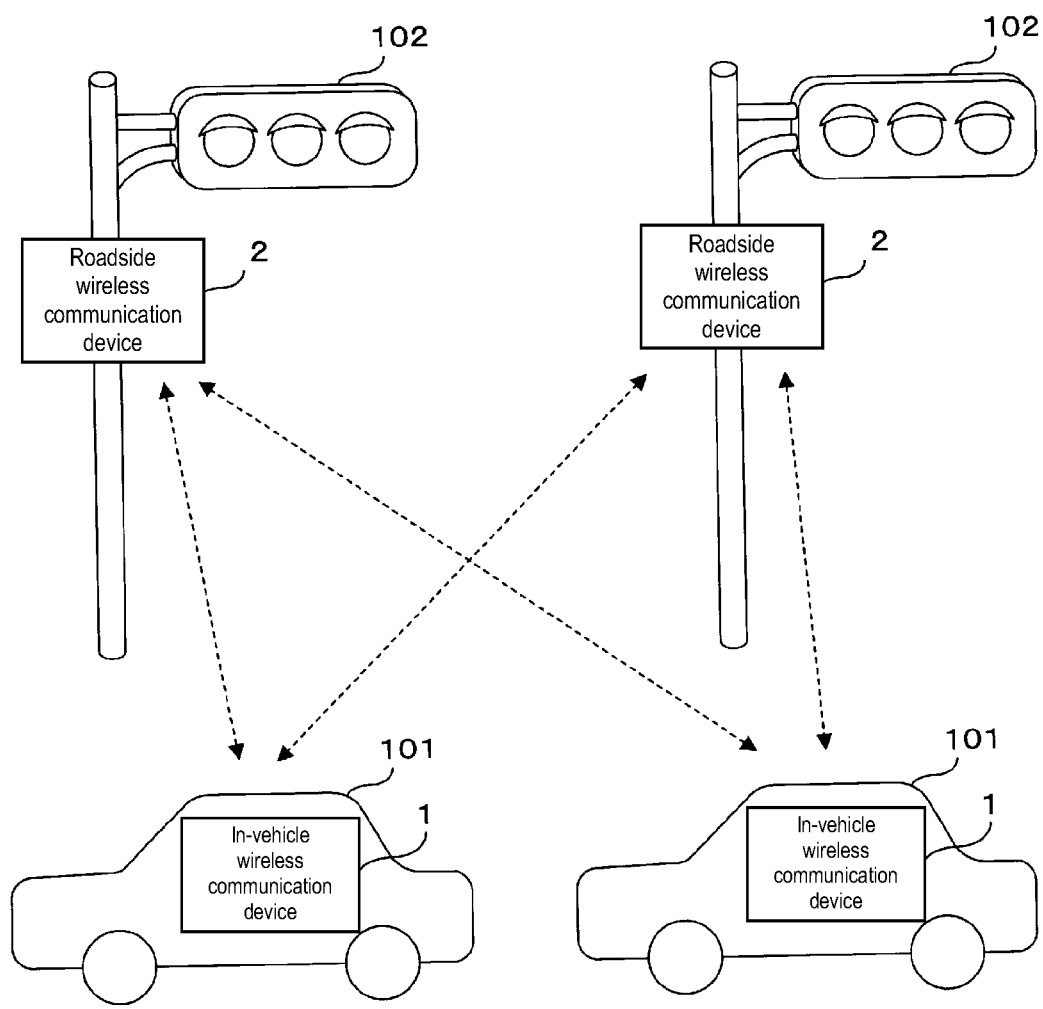
FIG. 1 is a schematic diagram for illustrating an overview of a wireless communication system according to the present embodiment.

First, embodiments of the present disclosure will be listed and described. At least some of the embodiments described below may be combined as appropriate.

First Aspect

An in-vehicle wireless communication device according to a first aspect is an in-vehicle wireless communication device that is mounted in a vehicle and includes a wireless communication unit for performing wireless communication with an external device installed outside of the vehicle and a processing unit for performing processing relating to communication, in which the processing unit determines a communication amount in an in-vehicle network provided inside of the vehicle, transmits communication amount information relating to the determined communication amount to the external device by the wireless communication unit, and receives data transmitted from the external device at a size corresponding to the transmitted communication amount information, by the wireless communication unit.

In the first aspect, the in-vehicle wireless communication device determines the communication amount in the in-vehicle network provided inside the vehicle. The in-vehicle wireless communication device wirelessly transmits information relating to the determined communication amount to an external device provided outside of the vehicle as communication amount information. Accordingly, based on the communication amount information from the in-vehicle wireless communication device, the external device can keep track of and estimate the communication status in the in-vehicle network of the vehicle that is to transmit the data and the like, and for example, can transmit the data to the in-vehicle wireless communication device with the data size compressed to a size suitable for the free capacity of communication of the in-vehicle network, or the like. The in-vehicle wireless communication device can receive the data transmitted from the external device at a size corresponding to the received communication amount information and can use the received data in the processing in the vehicle. Due to the in-vehicle wireless communication device transmitting the communication amount information, the external device can transmit data of a size suitable for the vehicle, and it can be expected that an increase in the amount of data transmitted and received between the road and vehicles will be suppressed.

Second Aspect

In a second aspect, it is preferable that the processing unit receives the communication amount information relating to the communication amount in wireless communication performed with the vehicle by the external device, from the external device, adjusts the size of the data to be transmitted to the external device according to the received communication amount information, and transmits the data with the adjusted size to the external device by the wireless communication unit.

In the second aspect, the external device determines the communication amount of wireless communication performed with one or more vehicles, and transmits communication amount information relating to the determined communication amount to the in-vehicle wireless communication device. Upon receiving the communication amount information from the external device, the in-vehicle wireless communication device adjusts the data size by compressing it to a size suitable for the free capacity of wireless communication of the external device or the like, for example, and transmits the data with the adjusted size to the external device. Due to the size of the data transmitted by the in-vehicle wireless communication device being adjusted according to the communication amount information received from the external device, the external device can receive data of a size that is suitable for the communication amount of wireless communication of the external device.

Third Aspect

In a third aspect, it is preferable that the processing unit receives a request for data from the external device by the wireless communication unit, adjusts the size of the data corresponding to the received request, and transmits image data with the adjusted size to the external device by the wireless communication unit.

In the third aspect, a request to acquire or transmit the data is given from the external device to the in-vehicle wireless communication device, and the in-vehicle wireless communication device transmits the requested data to the external device in response to the request. At this time, the in-vehicle wireless communication device adjusts the size of the data according to the request and transmits the data with the adjusted size to the external device. Accordingly, it can be expected that discarding or the like based on the fact that the size of the data requested by the external device is large will be prevented from occurring.

Fourth Aspect

In a fourth aspect, it is preferable that the processing unit requests stopping of transmission of data to the external device according to the determined communication amount.

In the fourth aspect, according to the determined communication amount, for example, if there is no leeway in the communication amount that can be transmitted and received in the in-vehicle network or the like, the in-vehicle wireless communication device requests stopping of the transmission of data to the external device. Upon receiving this request, the external device can stop the transmission of data to the in-vehicle wireless communication device, and thus it can be expected that data that cannot be handled in the vehicle will be prevented from being transmitted from the external device to the in-vehicle wireless communication device.

Fifth Aspect

In a fifth aspect, it is preferable that if there are a plurality of external devices with which the wireless communication unit can communicate, the processing unit determines priority levels of the plurality of external devices, and the processing unit requests stopping of transmission of data to the external device determined to have a low priority level.

In the fifth aspect, if the in-vehicle wireless communication device is in a state of being able to communicate with a plurality of external devices, the in-vehicle wireless communication device determines priority levels for the plurality of external devices. The in-vehicle wireless communication device requests stopping of transmission of data to an external device determined to have a low priority level. Accordingly, it can be expected that the in-vehicle wireless communication device will reliably receive data from an external device with a high priority level.

Sixth Aspect

A wireless communication system according to a sixth aspect is a wireless communication system by which an in-vehicle wireless communication device and an external device perform wireless communication with each other, the in-vehicle wireless communication device being mounted in a vehicle and including a wireless communication unit for performing wireless communication with the outside of the vehicle and a processing unit for performing processing relating to communication, and the external device being installed outside of the vehicle and including a wireless communication unit for performing wireless communication with the vehicle and a processing unit for performing processing relating to communication, in which the processing unit of the in-vehicle wireless communication device determines a communication amount in an in-vehicle network provided inside of the vehicle and transmits communication amount information relating to the determined communication amount to the external device, the processing unit of the external device receives the communication amount information transmitted by the in-vehicle wireless communication device, adjusts the size of the data to be transmitted to the in-vehicle wireless communication device according to the received communication amount information, and transmits the data with the adjusted size to the in-vehicle wireless communication device, and the processing unit of the in-vehicle wireless communication device receives the data transmitted by the external device at a size corresponding to the communication amount information.

In the sixth aspect, similarly to the first aspect, it can be expected that an increase in the amount of data transmitted and received between the road and vehicles will be suppressed.

Seventh Aspect

A wireless communication method according to a seventh aspect is a wireless communication method by which an in-vehicle wireless communication device mounted in a vehicle and an external device installed outside of the vehicle perform wireless communication with each other, in which the in-vehicle wireless communication device determines a communication amount in an in-vehicle network provided inside of the vehicle and transmits communication amount information relating to the determined communication amount to the external device, the external device receives the communication amount information transmitted by the in-vehicle wireless communication device, adjusts the size of data to be transmitted to the in-vehicle wireless communication device according to the received communication amount information, and transmits the data with the adjusted size to the in-vehicle wireless communication device, and the in-vehicle wireless communication device receives the data transmitted by the external device at a size corresponding to the communication amount information.

In the seventh aspect, similarly to the first aspect, it can be expected that an increase in the amount of data transmitted and received between the road and vehicles will be suppressed.

The following will describe specific examples of the wireless communication system according to the embodiment with reference to the drawings. The present disclosure is not limited to these examples but is defined by the claims, and all modifications within the meaning and scope equivalent to the claims are intended to be included.

System Configuration

FIG. 1 is a schematic diagram for illustrating an overview of a wireless communication system according to the present embodiment. The wireless communication system according to the present embodiment is a system in which an in-vehicle wireless communication device 1 mounted in a vehicle 101 and a roadside wireless communication device 2 provided on a traffic signal 102 installed at an intersection of roads or the like perform wireless communication with each other. Note that in the present embodiment, it is assumed that the roadside wireless communication device 2 is provided on the traffic signal 102, but there is no limitation to this, and for example, the roadside wireless communication device 2 may be provided in various facilities or equipment such as street lights, signposts, pedestrian bridges, and guardrails installed on a road. The in-vehicle wireless communication device 1 can perform wireless communication with one or more roadside wireless communication devices 2 present within a predetermined range (a range in which radio waves reach) from the vehicle 101. Similarly, the roadside wireless communication device 2 can perform wireless communication with one or a plurality of in-vehicle wireless communication devices 1 present within a predetermined range from the installation position of the traffic signal 102.

The wireless communication system according to the present embodiment can be applied to a system in which, for example, the roadside wireless communication device 2 transmits image data of an intersection imaged by a camera provided in a traffic signal 102 or the like to the vehicle-mounted wireless communication device 1 of the vehicle 101, and the driver is notified of the status of the intersection, which is a blind spot of the vehicle 101, due to it being displayed as an image. Also, in the wireless communication system, for example, the in-vehicle wireless communication device 1 can transmit image data imaged by a camera mounted on the vehicle 101 to the roadside wireless communication device 2, and due to the roadside wireless communication device 2 transmitting this image data to the in-vehicle wireless communication device 1 of another vehicle 101, the driver can be notified of the status of the intersection due to it being displayed as an image. In the wireless communication system, data can be transmitted and received in both directions from the in-vehicle wireless communication device 1 to the roadside wireless communication device 2 and from the roadside wireless communication device 2 to the in-vehicle wireless communication device 1.

Also, the data transmitted and received by the wireless communication system is not limited to the image data imaged by the above-mentioned camera, and may be various types of data. The data transmitted from the in-vehicle wireless communication device 1 to the roadside wireless communication device 2 can include, for example, various types of data such as detection results by various sensors mounted in the vehicle 101, position information of the vehicle 101, or information on an operation plan relating to automatic driving of the vehicle 101. The data transmitted from the roadside wireless communication device 2 to the in-vehicle wireless communication device 1 can include, for example, various types of data such as position information of one or more vehicles 101 present around the intersection, an urgent stop command to the vehicle 101, or data for updating an application program executed in the vehicle 101. These pieces of data transmitted and received by the in-vehicle wireless communication device 1 and the roadside wireless communication device 2 are examples, and there is no limitation to this.

As described above, various types of data are transmitted and received between the in-vehicle wireless communication device 1 and the roadside wireless communication device 2. Also, the vehicle 101 is equipped with multiple in-vehicle devices such as an ECU (Electronic Control Unit), and these multiple in-vehicle devices transmit and receive data via an in-vehicle network. The data transmitted by the roadside wireless communication device 2 is received by the in-vehicle wireless communication device 1, and the in-vehicle wireless communication device 1 transmits this data to the in-vehicle devices via the in-vehicle network. There is a limit to the amount of data that can be sent and received on the in-vehicle network, and if the amount of communication due to data transmission and reception between in-vehicle devices inside the vehicle 101 increases, a situation can occur in which the data received from outside the vehicle cannot be handled by the in-vehicle network. In view of this, in the wireless communication system according to the present embodiment, the in-vehicle wireless communication device 1 determines the communication amount of the in-vehicle network of the vehicle 101 and transmits it to the roadside wireless communication device 2, and the roadside wireless communication device 2 compresses the data according to the communication amount and transmits the compressed data to the in-vehicle wireless communication device 1. As a result, the in-vehicle wireless communication device 1 can receive data of a size that can be handled by the in-vehicle network from the roadside wireless communication device 2.

Note that in the present embodiment, the amount of data that can be transmitted and received in the communication between the devices is referred to as the communication capacity, and the amount of data being transmitted and received at a certain point in time is referred to as the communication amount. Also, the difference between the communication capacity and the communication amount at a certain point in time is called the free capacity. The communication capacity can also be generally referred to as the communication band. The communication capacity, the communication amount, and the free capacity are, for example, amounts expressed in units such as bits/second and packets/second.

Similarly, the roadside wireless communication device 2 transmits and receives data to and from a plurality of in-vehicle wireless communication devices 1. For example, if a large number of vehicles 101 are present around an intersection where a traffic signal 102 is installed, a situation can occur in which the communication amount of data transmitted and received through wireless communication between the roadside wireless communication device 2 and a large number of in-vehicle wireless communication devices 1 increases, and it will not be possible to handle this with the communication capacity of the wireless communication of the roadside wireless communication device 2. In view of this, in the wireless communication system according to the present embodiment, the roadside wireless communication device 2 determines the communication amount of wireless communication performed with one or a plurality of in-vehicle wireless communication devices 1 and transmits the determined communication amount to the in-vehicle wireless communication device 1, and the in-vehicle wireless communication device 1 compresses the data according to this communication amount and transmits the compressed data to the roadside wireless communication device 2. As a result, the roadside wireless communication device 2 can receive data of a size that can be handled by the communication capacity of its own wireless communication from the in-vehicle wireless communication device 1.

Figure 2:
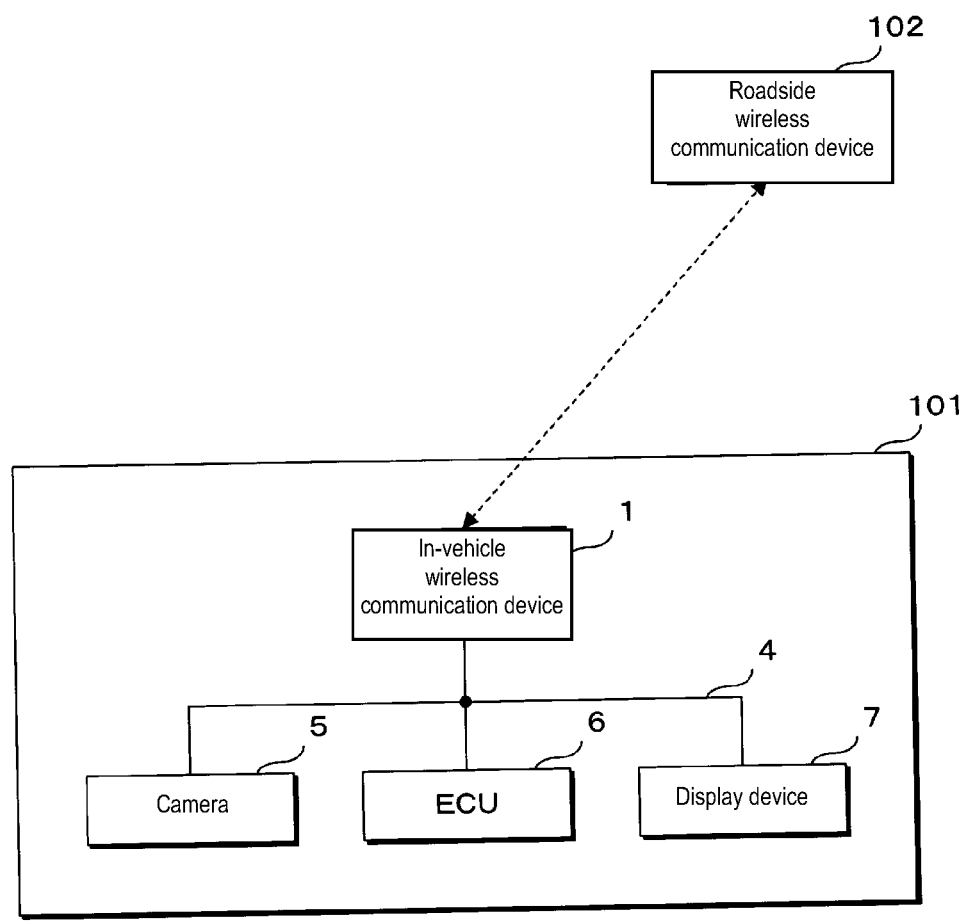
FIG. 2 is a schematic diagram showing a configuration example of a vehicle of the wireless communication system according to the present embodiment.

FIG. 2 is a schematic diagram showing a configuration example of the vehicle 101 of the wireless communication system according to the present embodiment. The vehicle 101 according to the present embodiment is equipped with the above-mentioned in-vehicle wireless communication device 1 and various in-vehicle devices such as a camera 5, an ECU 6, and a display device 7. The in-vehicle wireless communication device 1, the camera 5, the ECU 6, the display device 7, and the like are connected to each other via the in-vehicle network 4 provided in the vehicle 101, and can transmit and receive data to and from each other. Note that in FIG. 2, the in-vehicle network 4 is shown as a bus-type network, but there is no limitation to this, and other network configurations such as a star-type or a ring-type may be adopted. Also, FIG. 2 shows a camera 5, an ECU 6, and a display device 7 as in-vehicle devices mounted in the vehicle 101, but this is an example, and any kind of device may be mounted in the vehicle 101.

The data transmitted by the roadside wireless communication device 2 is received by the in-vehicle wireless communication device 1 of the vehicle 101. The in-vehicle wireless communication device 1 transmits the data received from the roadside wireless communication device 2 to, for example, the ECU 6, the display device 7, or the like that requires the data via the in-vehicle network 4. Also, the in-vehicle wireless communication device 1 acquires data to be transmitted to the outside of the vehicle from the camera 5, the ECU 6, or the like via the in-vehicle network 4, and transmits the acquired data to the roadside wireless communication device 2.

Figure 3:
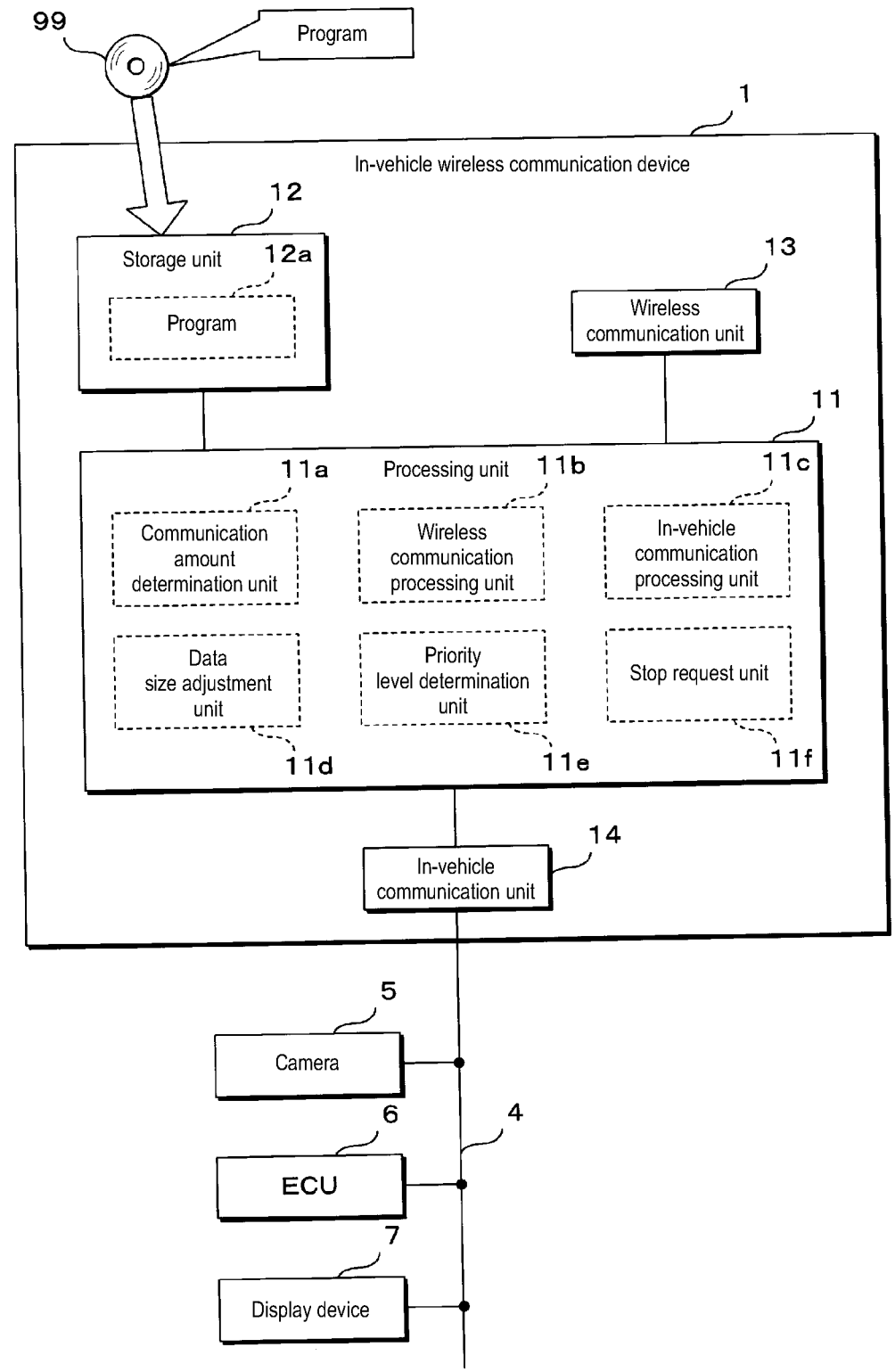
FIG. 3 is a schematic diagram showing a configuration of an in-vehicle wireless communication device according to the present embodiment.

FIG. 3 is a schematic diagram showing the configuration of the in-vehicle wireless communication device 1 according to the present embodiment. The in-vehicle wireless communication device 1 according to the present embodiment includes a processing unit (processor) 11, a storage unit (storage) 12, a wireless communication unit (transceiver) 13, an in-vehicle communication unit (transceiver) 14, and the like. The processing unit 11 is constituted using, for example, an arithmetic processing device such as a CPU (Central Processing Unit) or an MPU (Micro-Processing Unit). The processing unit 11 can perform various types of processing by reading out and executing a program stored in the storage unit 12. In the present embodiment, by reading out and executing a program 12a stored in the storage unit 12, the processing unit 11 performs various types of processing such as processing for transmitting and receiving data wirelessly with the roadside wireless communication device 2 provided outside of the vehicle 101 and processing for controlling wireless transmission and reception of data according to the communication amount of the in-vehicle network 4.

The storage unit 12 is constituted by using, for example, a non-volatile memory element such as a flash memory or an EEPROM (Electrically Erasable Programmable Read Only Memory). The storage unit 12 stores various programs to be executed by the processing unit 11 and various types of data required for processing performed by the processing unit 11. In the present embodiment, the storage unit 12 stores the program 12*a* to be executed by the processing unit 11.

Note that the program 12*a* may be written in the storage unit 12, for example, at the manufacturing stage of the in-vehicle wireless communication device 1, a program distributed by a remote server device or the like, for example, may be acquired by the in-vehicle wireless communication device 1 through communication, a program recorded on a recording medium 99 such as a memory card or an optical disk, for example, may be read out by the in-vehicle wireless communication device 1 and stored in the storage unit 12, and a program recorded on the recording medium 99, for example, may be read out and written in the storage unit 12 of the in-vehicle wireless communication device 1 by a writing device. The program 12*a* may be provided in a form of distribution via the network, or may be provided in a form recorded on the recording medium 99.

The wireless communication unit 13 performs wireless communication with the roadside wireless communication device 2 provided outside the vehicle 101. The wireless communication unit 13 transmits data to the roadside wireless communication device 2 by outputting a signal obtained by modulating the data for transmission provided from the processing unit 11 from an antenna (not shown), receives the data from the roadside wireless communication device 2 by demodulating the signal received by the antenna, and provides the received data to the processing unit 11.

The in-vehicle communication unit 14 is connected to the in-vehicle network 4 and performs transmission and reception of data to and from in-vehicle devices such as the camera 5, the ECU 6, and the display device 7 via the in-vehicle network 4. In the present embodiment, the in-vehicle communication unit 14 transmits and receives data according to, for example, a CAN (Controller Area Network) communication standard. The in-vehicle communication unit 14 can be constituted by using, for example, an IC of a CAN controller. However, the communication standard used by the in-vehicle communication unit 14 is not limited to CAN, and the in-vehicle communication unit 14 may perform communication using a communication standard other than CAN, for example, a communication standard such as Ethernet (registered trademark). The in-vehicle communication unit 14 transmits data by outputting the message provided by the processing unit 11 as an electric signal to the communication line constituting the in-vehicle network 4. Also, the in-vehicle communication unit 14 converts the electric signal of the communication line into digital data by sampling and acquiring the potential of the communication line, and provides the converted data to the processing unit 11 as reception data.

Also, in the in-vehicle wireless communication device 1 according to the present embodiment, due to the processing unit 11 reading out and executing the program 12*a* stored in the storage unit 12, a communication amount determination unit 11*a*, a wireless communication processing unit 11*b*, an in-vehicle communication processing unit 11*c*, a data size adjustment unit 11*d*, a priority level determination unit 11*e*, a stop request unit 11*f*, and the like are realized in the processing unit 11 as software-like functional units.

The communication amount determination unit 11*a* performs processing for determining the communication amount of data transmitted and received via the in-vehicle network 4. The communication amount determination unit 11*a* can monitor the data transmitted and received via the in-vehicle network 4, measure the amount of data transmitted and received via the in-vehicle network 4 in a predetermined period such as one second, and set the measured amount of data as the communication amount. Also, the communication amount determination unit 11*a* may, for example, perform the measurement for the predetermined period a plurality of times and set the average value as the communication amount. Also, the communication amount determination unit 11*a* may predict the future communication amount based on the measured past and present amounts of data, and may set the predicted amount of data as the communication amount. In this case, any method may be adopted as the method for predicting the communication amount.

The wireless communication processing unit 11*b* performs processing relating to wireless communication with the roadside wireless communication device 2 by the wireless communication unit 13. The wireless communication processing unit 11*b* wirelessly transmits data to the roadside wireless communication device 2 by generating data to be transmitted to the roadside wireless communication device 2 and providing the data to the wireless communication unit 13. The wireless communication processing unit 11*b* receives the data wirelessly transmitted from the roadside wireless communication device 2 by the wireless communication unit 13.

Also, in the present embodiment, the wireless communication processing unit 11*b* performs processing for transmitting information relating to the communication amount determined by the communication amount determination unit 11*a* to the roadside wireless communication device 2 as communication amount information. The information included in the communication amount information may be, for example, the communication amount determined by the communication amount determination unit 11*a*, or may be, for example, the free capacity of the in-vehicle network 4 calculated based on the communication amount determined by the communication amount determination unit 11*a*. However, if the communication amount determined by the communication amount determination unit 11*a* is transmitted as the communication amount information, it is preferable to include the communication capacity of the in-vehicle network 4 in the communication amount information. The free capacity of the in-vehicle network 4 can be calculated as the difference between the communication capacity of the in-vehicle network 4 and the communication amount determined by the communication amount determination unit 11*a*. The communication amount information transmitted by the wireless communication processing unit 11*b* need only include information according to which the roadside wireless communication device 2 can keep track of the free capacity of the in-vehicle network 4. The communication capacity of the in-vehicle network 4 is determined at the design stage of the vehicle 101 or the like, and the value thereof is stored in the storage unit 12 or the like.

Also, in the present embodiment, the wireless communication processing unit 11*b* receives the communication amount information transmitted by the roadside wireless communication device 2. The communication amount information transmitted by the roadside wireless communication device 2 is information relating to the communication amount of wireless communication performed by the roadside wireless communication device 2. The wireless communication processing unit 11*b* provides the received communication amount information to the data size adjustment unit 11*d*.

The in-vehicle communication processing unit 11*c* performs processing relating to communication performed via the in-vehicle network 4 by the in-vehicle communication unit 14. The in-vehicle communication unit 14 performs data transmission to the in-vehicle devices such as the camera 5, the ECU 6, and the display device 7 mounted in the vehicle 101 by generating data to be transmitted to the in-vehicle devices and providing the generated data to the in-vehicle communication unit 14. The in-vehicle communication processing unit 11c receives the data transmitted by the in-vehicle device in the in-vehicle communication unit 14.

The wireless communication processing unit 11b and the in-vehicle communication processing unit 11c relay data between the roadside wireless communication device 2 and the in-vehicle device in the vehicle 101 by the in-vehicle wireless communication device 1. The wireless communication processing unit 11b receives the data from the roadside wireless communication device 2 and provides the received data to the in-vehicle communication processing unit 11c, and the in-vehicle communication processing unit 11c transmits this data to the in-vehicle device via the in-vehicle network 4. The in-vehicle communication processing unit 11c receives data from the in-vehicle device via the in-vehicle network 4 and provides the received data to the wireless communication processing unit 11b, and the wireless communication processing unit 11b transmits this data to the roadside wireless communication device 2.

If the wireless communication processing unit 11b receives a predetermined data acquisition request from the roadside wireless communication device 2, the wireless communication processing unit 11b provides the received acquisition request to the in-vehicle communication processing unit 11c. The in-vehicle communication processing unit 11c acquires the data requested in the acquisition request from the data transmitted and received via the in-vehicle network 4, and provides the acquired data to the wireless communication processing unit 11b. The wireless communication processing unit 11b transmits the data provided from the in-vehicle communication processing unit 11c to the roadside wireless communication device 2 as data relating to the acquisition request. Also, the wireless communication processing unit 11b may transmit an acquisition request for predetermined data to the roadside wireless communication device 2.

The data size adjustment unit 11d performs processing for adjusting the size of data to be transmitted to the roadside wireless communication device 2 based on the communication amount information received from the roadside wireless communication device 2. The data size adjustment unit 11d determines the free capacity of the wireless communication of the roadside wireless communication device 2 based on the communication amount information. If the size of the data to be transmitted to the roadside wireless communication device 2 exceeds the free capacity obtained based on the communication amount information, the data size adjusting unit 11d performs processing for reducing (compressing) the size of this data. For example, if the data to be transmitted is the image data imaged by the camera 5, the data size adjustment unit 11d reduces the data size through a method such as reducing the resolution of the image data, reducing the frame rate, or changing from a color image to a monochrome image. Also, for example, the data size adjustment unit 11d may compress the data size using a coding technique that changes the information to be represented by a smaller number of bits than the original representation. The compression of the data size performed by the data size adjustment unit 11d may be either lossless compression or lossy compression. Also, the degree to which the data size adjusting unit 11d compresses the data size may be determined in advance such that it is, for example, 80% or less of the free capacity, or the like, and the compression rate may be variable based on, for example, a prediction of a future communication volume, or the like.

The priority level determination unit 11e performs processing for determining which roadside wireless communication device 2 is prioritized when the in-vehicle wireless communication device 1 can perform wireless communication with a plurality of roadside wireless communication devices 2. The priority level determination unit 11e may determine the priority level according to, for example, the type of data transmitted by each roadside wireless communication device 2, may determine the priority level according to, for example, the positional relationship, the distance, or the like between the vehicle 101 and the roadside wireless communication device 2, and may determine the priority level using a reference other than these. Any method may be adopted as the method for determining the priority levels of the plurality of roadside wireless communication devices 2 by the priority level determination unit 11e.

The stop request unit 11f performs processing for requesting the roadside wireless communication device 2 having a low priority level determined by the priority level determination unit 11e to stop transmitting data in a situation where the in-vehicle wireless communication device 1 can perform wireless communication with a plurality of roadside wireless communication devices 2. The stop request unit 11f calculates the free capacity of the in-vehicle network 4 based on the communication amount determined by the communication amount determination unit 11a, and gives a request to stop data transmission to the roadside wireless communication device 2 determined to have a low priority level if the free capacity becomes less than a predetermined threshold value.

Figure 4:
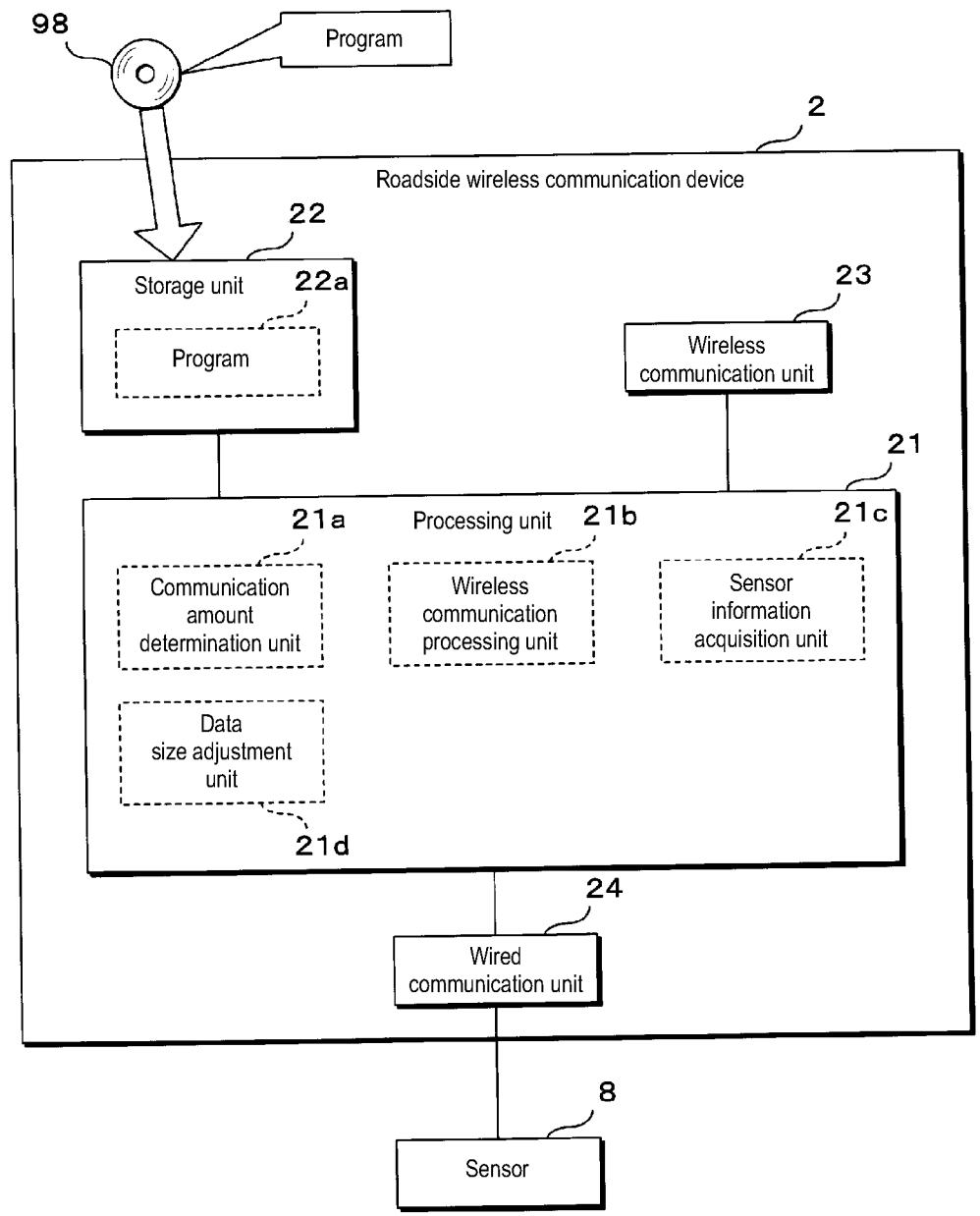
FIG. 4 is a block diagram showing a configuration of a roadside wireless communication device according to the present embodiment.

FIG. 4 is a block diagram showing a configuration of the roadside wireless communication device 2 according to the present embodiment. The roadside wireless communication device 2 according to the present embodiment includes a processing unit (processor) 21, a storage unit (storage) 22, a wireless communication unit (transceiver) 23, a wired communication unit (transceiver) 24, and the like. The processing unit 21 is constituted by using an arithmetic processing device such as a CPU or an MPU. The processing unit 21 can perform various processes by reading and executing the program stored in the storage unit 22. In the present embodiment, the processing unit 21 performs various types of processing such as processing for transmitting and receiving data wirelessly with the in-vehicle wireless communication device 1 mounted in the vehicle 101 by reading and executing the program 22a stored in the storage unit 22.

The storage unit 22 is constituted by using, for example, a non-volatile memory element such as a flash memory or an EEPROM. The storage unit 22 stores various programs to be executed by the processing unit 21 and various types of data required for processing performed by the processing unit 21. In the present embodiment, the storage unit 22 stores the program 22a to be executed by the processing unit 21.

Note that the program 22a may be written in the storage unit 22 at the manufacturing stage of the roadside wireless communication device 2, for example, a program distributed by a remote server or the like, for example, may be acquired by the roadside wireless communication device 2 through communication, the roadside wireless communication device 2 may read out a program recorded in the recording medium 98 such as a memory card or an optical disk, for example, and store the program in the storage unit 22, and a writing device may read out a program recorded in the recording medium 98 and write it in the storage unit 22 of the roadside wireless communication device 2. The program 22a may be provided in a mode of distribution via a network, or may be provided in a mode recorded in the recording medium 98.

The wireless communication unit 23 performs wireless communication with the in-vehicle wireless communication device 1 provided in the vehicle 101. The wireless communication unit 23 transmits data to the in-vehicle wireless communication device 1 by outputting a signal obtained by modulating the data for transmission provided from the processing unit 21 from an antenna (not shown), and receives the data from the in-vehicle wireless communication device 1 by demodulating the signal received by the antenna, and provides the received data to the processing unit 21.

The roadside wireless communication device 2 according to the present embodiment is connected to various sensors 8 installed around the intersection where the traffic signal 102 is installed, via a communication line, a signal line, or the like. As the sensor 8, for example, various things can be adopted, such as a camera that images an intersection, or a sensor that detects a vehicle, a pedestrian, or the like present near the intersection. The wired communication unit 24 transmits and receives data to and from these sensors 8 via a communication line, a signal line, or the like. The wired communication unit 24 receives the data transmitted from the sensor 8, provides it to the processing unit 21, and transmits the data provided from the processing unit 21 to the sensor 8. The wired communication unit 24 may transmit and receive data to and from the sensor 8 based on any kind of communication standard. Also, the wired communication unit 24 may communicate with the sensor 8 via, for example, a wide area network such as the Internet, and may communicate with another roadside wireless communication device 2 provided in another traffic signal 102. Note that in the present embodiment, it is assumed that the roadside wireless communication device 2 performs wired communication with the sensor 8, but there is no limitation to this, and the roadside wireless communication device 2 may perform wireless communication with the sensor 8.

Also, in the roadside wireless communication device 2 according to the present embodiment, due to the processing unit 21 reading out and executing the program 22a stored in the storage unit 22, a communication amount determination unit 21a, a wireless communication processing unit 21b, a sensor information acquisition unit 21c, a data size adjustment unit 21d, and the like are realized in the processing unit 21 as software-like functional units.

The communication amount determination unit 21a performs processing for determining the communication amount of data transmitted and received wirelessly by the wireless communication unit 23. The communication amount determination unit 21a can monitor the data transmitted and received by the wireless communication unit 23, measure the amount of data transmitted and received in a predetermined period such as one second, and set the measured amount of data as the communication amount. Also, the communication amount determination unit 21a may, for example, perform the measurement for the predetermined period a plurality of times and set the average value as the communication amount. Also, the communication amount determination unit 21a may predict the future communication amount based on the measured past and present amounts of data, and may set the predicted amount of data as the communication amount. In this case, any kind of method may be adopted as the method for predicting the communication amount.

The wireless communication processing unit 21b performs processing relating to wireless communication with the in-vehicle wireless communication device 1 by the wireless communication unit 23. The wireless communication processing unit 21b wirelessly transmits data to the in-vehicle wireless communication device 1 by generating data to be transmitted to the in-vehicle wireless communication device 1 and providing the data to the wireless communication unit 23. The wireless communication processing unit 21b receives the data wirelessly transmitted from the in-vehicle wireless communication device 1 in the wireless communication unit 23.

Also, in the present embodiment, the wireless communication processing unit 21b performs processing for transmitting information relating to the communication amount determined by the communication amount determination unit 21a to the in-vehicle wireless communication device 1 as communication amount information. The information included in the communication amount information may be, for example, the communication amount determined by the communication amount determination unit 21a, or may be, for example, the free capacity of wireless communication calculated based on the communication amount determined by the communication amount determination unit 21a. However, if the communication amount determined by the communication amount determination unit 21a is transmitted as the communication amount information, it is preferable to include the communication capacity of the wireless communication in the communication amount information. The free capacity of wireless communication can be calculated as the difference between the communication capacity of wireless communication and the communication amount determined by the communication amount determination unit 21a. The communication amount information transmitted by the wireless communication processing unit 21b need only include information according to which the in-vehicle wireless communication device 1 can keep track of the free capacity of wireless communication. The communication capacity of wireless communication is determined at the design stage of the roadside wireless communication device 2, and the value thereof is stored in the storage unit 22 or the like.

Also, in the present embodiment, the wireless communication processing unit 21b receives the communication amount information transmitted by the in-vehicle wireless communication device 1. The communication amount information transmitted by the in-vehicle wireless communication device 1 is information relating to the communication amount of data transmission and reception via the in-vehicle network 4 in the vehicle 101. The wireless communication processing unit 21b provides the received communication amount information to the data size adjustment unit 21d.

The sensor information acquisition unit 21c performs processing for acquiring various types of information detected by the sensors 8 by performing communication by the wired communication unit 24 via a communication line, a signal line, or the like. The sensors 8 transmit, for example, an image obtained by imaging, or data on information relating to a vehicle or a pedestrian whose presence is detected, and the sensor information acquisition unit 21c acquires the information from the sensors 8 by receiving these pieces of data transmitted by the sensors 8 by the wired communication unit 24.

The sensor information acquisition unit 21c provides the acquired information of the sensor 8 to the wireless communication processing unit 21b, and the wireless communication processing unit 21b wirelessly transmits data including the provided information to the in-vehicle wireless communication device 1 mounted in the vehicle 101. Also, if the wireless communication processing unit 21b receives a predetermined data acquisition request from the in-vehicle wireless communication device 1, the wireless communication processing unit 21b provides the received acquisition request to the sensor information acquisition unit 21c. The sensor information acquisition unit 21c acquires the information relating to the requested data from the sensor 8 and provides the acquired information to the wireless communication processing unit 21b, and the wireless communication processing unit 21b wirelessly transmits the provided information of the sensor 8 to the in-vehicle wireless communication device 1 that is the request source.

Also, the wireless communication processing unit 21b transmits a request to acquire predetermined data to the in-vehicle wireless communication device 1. For example, regarding a location that is a blind spot that cannot be imaged with a camera installed as a sensor 8 in the intersection, the roadside wireless communication device 2 may request transmission of image data imaged by the camera 5 to the in-vehicle wireless communication device 1 of the vehicle 101 that can carry out imaging of this blind spot. Also, for example, the roadside wireless communication device 2 may request the in-vehicle wireless communication device 1 to transmit various types of data such as the position information of the vehicle 101, destination information set in a car navigation device, or the vehicle speed of the vehicle 101.

The data size adjustment unit 21d performs processing for adjusting the size of data to be transmitted to the in-vehicle wireless communication device 1 based on the communication amount information received from the in-vehicle wireless communication device 1. The data size adjustment unit 21d determines the free capacity of the in-vehicle network 4 of the vehicle 101 in which the in-vehicle wireless communication device 1 is mounted based on the communication amount information. If the size of the data to be transmitted to the in-vehicle wireless communication device 1 exceeds the free capacity based on the communication amount information, the data size adjustment unit 21d performs processing for reducing (compressing) the size of this data. For example, if the data to be transmitted is image data imaged by a camera, the data size adjustment unit 21d reduces the data size through a method such as reducing the resolution of the image data, reducing the frame rate, and changing from a color image to a monochrome image. Also, for example, the data size adjusting unit 21d may compress the data size using a coding technique that changes the information such that it is expressed with a smaller number of bits than the original expression. The data size compression performed by the data size adjustment unit 21d may be either lossless compression or lossy compression. The extent to which the data size adjustment unit 21d compresses the data size may be predetermined, for example, 80% or less of the free capacity, or the like, or the compression rate may be made variable based on, for example, a prediction of a future communication amount or the like.

Data Transmission Processing

Figure 5:
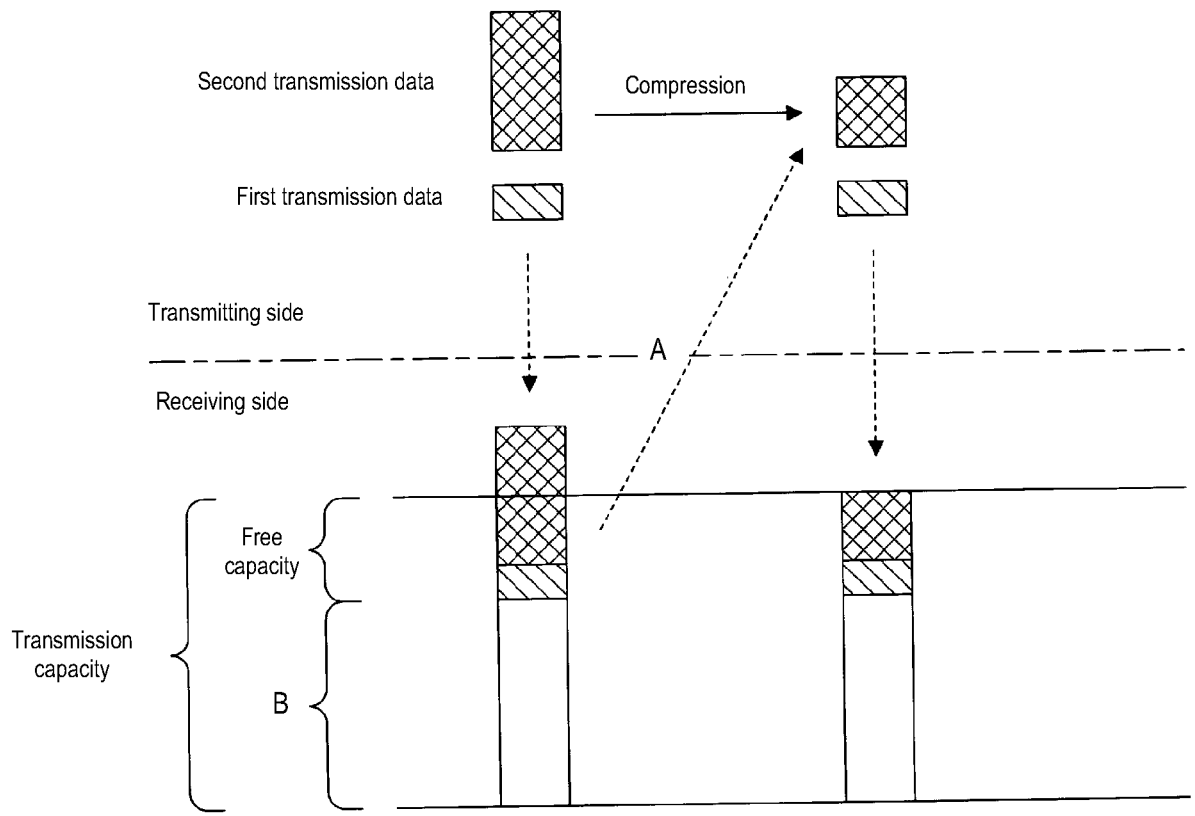
FIG. 5 is a schematic diagram for illustrating data transmission processing performed in the wireless communication system according to the present embodiment.

FIG. 5 is a schematic diagram for describing data transmission processing performed in the wireless communication system according to the present embodiment. Note that in the following description, the device on the data transmitting side will be referred to as a "roadside wireless communication device 2", and the device on the data receiving side will be referred to as an "in-vehicle wireless communication device 1", but the same applies even if the reverse is true. In the example shown in the drawing, the transmission-side roadside wireless communication device 2 includes transmission data having a first transmission data with a small data size (a small data amount) and a second transmission data with a large data size (a large data amount) as data to be transmitted to the in-vehicle wireless communication device 1 on the receiving side. Note that in FIG. 5, each piece of transmission data is shown with different hatching as a block having a size corresponding to the data amount.

The in-vehicle wireless communication device 1 on the receiving side determines the communication amount of the in-vehicle network 4 of the vehicle 101, and calculates the free capacity based on the difference between the determined communication amount and the communication capacity of the in-vehicle network 4. The in-vehicle wireless communication device 1 transmits the communication amount information including the information on the calculated free capacity (or communication capacity and communication amount) to the roadside wireless communication device 2. Note that the determination of the communication amount and the transmission of the communication amount information by the in-vehicle wireless communication device 1 are repeatedly performed at a predetermined period.

In the illustrated example, if the roadside wireless communication device 2 transmits the first transmission data and the second transmission data to the in-vehicle wireless communication device 1, the data size of the second transmission data is large and exceeds the free capacity of the in-vehicle network 4. The roadside wireless communication device 2 that has received the communication amount information from the in-vehicle wireless communication device 1 keeps track of the communication status of the in-vehicle network 4 of the vehicle 101 to which the data is transmitted, and compresses the second transmission data having a large data size. At this time, the roadside wireless communication device 2 determines the compression rate of the second transmission data based on the received communication amount information so as to fit in the free capacity of the in-vehicle network 4. The roadside wireless communication device 2 transmits the first transmission data and transmits the compressed second transmission data to the in-vehicle wireless communication device 1. The in-vehicle wireless communication device 1 receives the first transmission data and the second transmission data transmitted from the roadside wireless communication device 2, and transmits these pieces of data to the in-vehicle device in the vehicle 101 via the in-vehicle network 4.

Note that the same also applies to the case where the device on the data transmitting side is the in-vehicle wireless communication device 1 and the device on the data receiving side is the roadside wireless communication device 2. The roadside wireless communication device 2 repeatedly determines the communication amount related to wireless communication and transmits the communication amount information at a predetermined period. The in-vehicle wireless communication device 1 that has received the communication amount information from the roadside wireless communication device 2 compresses the transmission data according to the free capacity of the roadside wireless communication device 2 and transmits the compressed transmission data.

Figure 6:
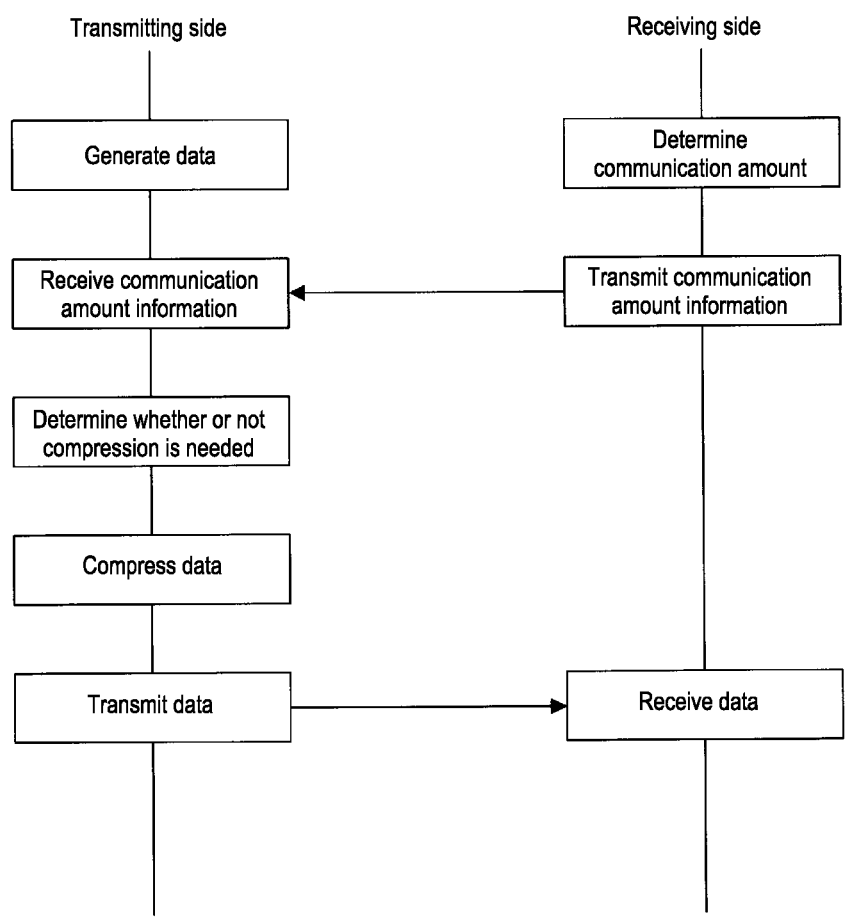
FIG. 6 is a schematic diagram for illustrating data transmission processing performed in the wireless communication system according to the present embodiment.

FIG. 6 is a schematic diagram for illustrating data transmission processing performed in the wireless communication system according to the present embodiment. The in-vehicle wireless communication device 1, which is a device on the data receiving side, determines the communication amount of the in-vehicle network 4 of the vehicle 101, and transmits the communication amount information including information such as the determined communication amount or the free capacity calculated based on the determined communication amount to the roadside wireless communication device 2, which is the device on the data transmitting side.

The roadside wireless communication device 2 generates data to be transmitted to the in-vehicle wireless communication device 1, and receives communication amount information transmitted from the in-vehicle wireless communication device 1. The roadside wireless communication device 2 determines whether or not the transmission data needs to be compressed by, for example, comparing the free capacity of the in-vehicle network 4 and the data size of the transmission data based on the received communication amount information. At this time, the roadside wireless communication device 2 may determine the compression rate of the transmission data. If the roadside wireless communication device 2 determines that the transmission data needs to be compressed, the roadside wireless communication device 2 compresses the transmission data to adjust the data size, and transmits the compressed data to the in-vehicle wireless communication device 1. Note that if it is determined that compression is not needed, the roadside wireless communication device 2 may transmit the data to the in-vehicle wireless communication device 1 without compressing the data. The in-vehicle wireless communication device 1 receives the data transmitted from the roadside wireless communication device 2.

Figure 7:
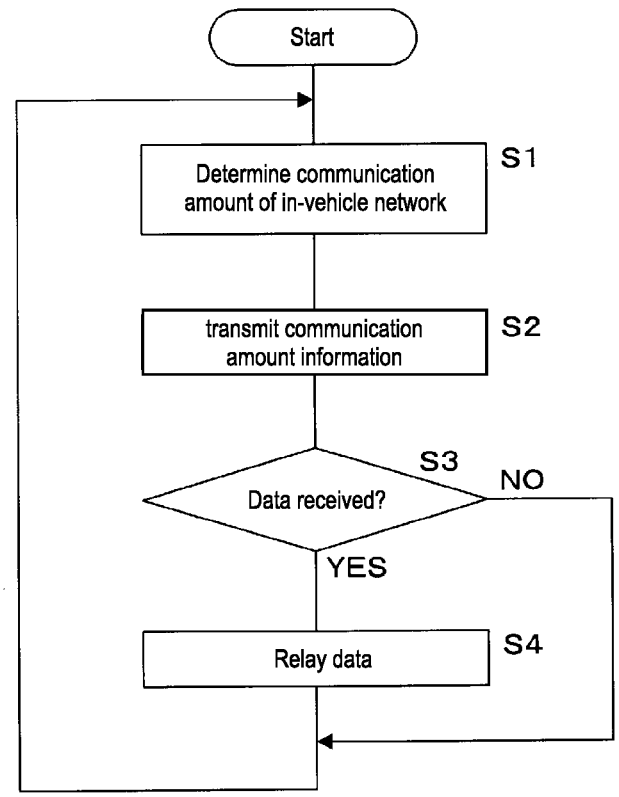
FIG. 7 is a flowchart showing a procedure of data reception processing performed by an in-vehicle wireless communication device according to the present embodiment.

FIG. 7 is a flowchart showing a procedure of data reception processing performed by the in-vehicle wireless communication device 1 according to the present embodiment. The communication amount determination unit 11a of the processing unit 11 of the in-vehicle wireless communication device 1 according to the present embodiment determines the communication amount of the in-vehicle network 4 by monitoring the transmission and reception of data in the in-vehicle network 4 of the vehicle 101 (step S1). The wireless communication processing unit 11b of the processing unit 11 generates communication amount information including information such as the communication amount determined in step S1 or the free capacity calculated based on this communication amount, and wirelessly transmits the generated communication amount information to the roadside wireless communication device 2 (step S2).

The wireless communication processing unit 11b determines whether or not data transmitted wirelessly from the roadside wireless communication device 2 has been received (step S3). If the data has been received (S3: YES), the wireless communication processing unit 11b provides the received data to the in-vehicle communication processing unit 11c, and the in-vehicle communication processing unit 11c relays this data to the in-vehicle devices of the vehicle 101 (step S4) and returns the processing to step S1. If no data has been received (S3: NO), the processing unit 11 returns the processing to step S1.

Figure 8:
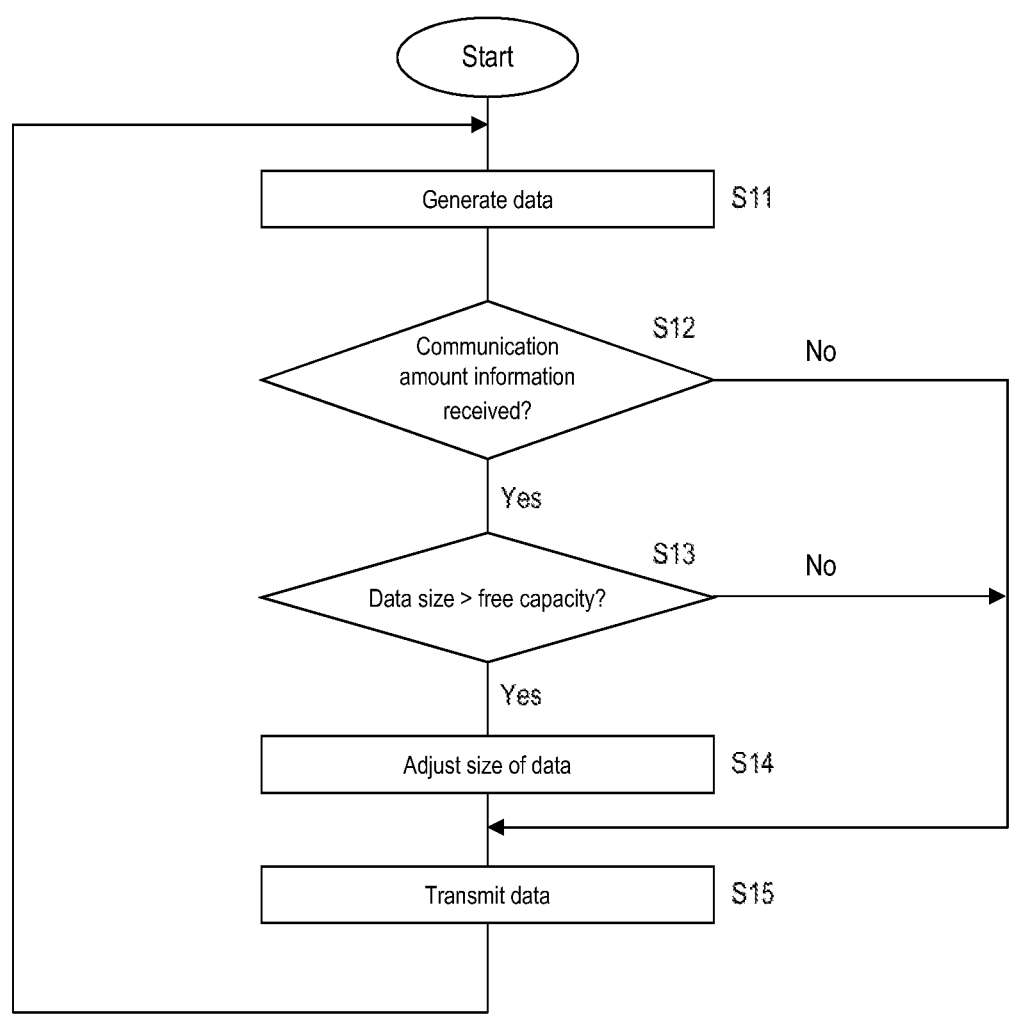
FIG. 8 is a flowchart showing a procedure of data transmission processing performed by the roadside wireless communication device according to the present embodiment.

FIG. 8 is a flowchart showing a procedure of data transmission processing performed by the roadside wireless communication device 2 according to the present embodiment. The processing unit 21 of the roadside wireless communication device 2 according to the present embodiment generates data to be transmitted to the in-vehicle wireless communication device 1 based on, for example, the detection result of the sensor 8 acquired by the sensor information acquisition unit 21c (step S11). The wireless communication processing unit 21b of the processing unit 21 determines whether or not the communication amount information transmitted by the in-vehicle wireless communication device 1 has been received (step S12).

If the communication amount information has been received (S12: YES), the wireless communication processing unit 21b determines whether or not the data size of the data generated in step S1 exceeds the free capacity based on the communication amount information (step S13). If the data size exceeds the free capacity (S13: YES), the data size adjustment unit 21d of the processing unit 21 adjusts the size of the data by compressing the data to be transmitted (step S14). The wireless communication processing unit 21b transmits the size-adjusted data to the in-vehicle wireless communication device 1 (step S15), and returns the processing to step S11.

If the communication amount information has not been received from the in-vehicle wireless communication device 1 (S12: NO), or if the data size of the data to be transmitted does not exceed the free capacity (S13: NO), the wireless communication processing unit 21b transmits the data generated in step S11 to the in-vehicle wireless communication device 1 (step S15) without adjusting the size, and returns the processing to step S11.

Figure 9:
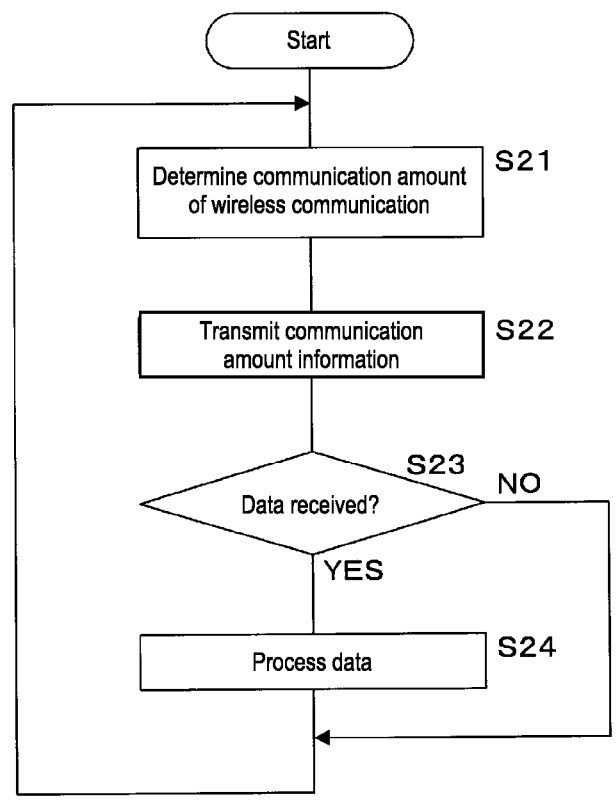
FIG. 9 is a flowchart showing a procedure of data reception processing performed by the roadside wireless communication device according to the present embodiment.

FIG. 9 is a flowchart showing a procedure of data reception processing performed by the roadside wireless communication device 2 according to the present embodiment. The communication amount determination unit 21a of the processing unit 21 of the roadside wireless communication device 2 according to the present embodiment determines the communication amount of the wireless communication by monitoring the wireless communication of the wireless communication unit 23 (step S21). The wireless communication processing unit 21b of the processing unit 21 generates communication amount information including information such as the communication amount determined in step S21 or the free capacity calculated based on this communication amount, and wirelessly transmits the generated communication amount information to the in-vehicle wireless communication device 1 (step S22).

The wireless communication processing unit 21b determines whether or not the data transmitted wirelessly from the in-vehicle wireless communication device 1 has been received (step S23). If the data has been received (S23: YES), the processing unit 21 performs data processing according to the received data (step S24), and returns the processing to step S21. If no data has been received (S23: NO), the processing unit 21 returns the processing to step S21.

Figure 10:
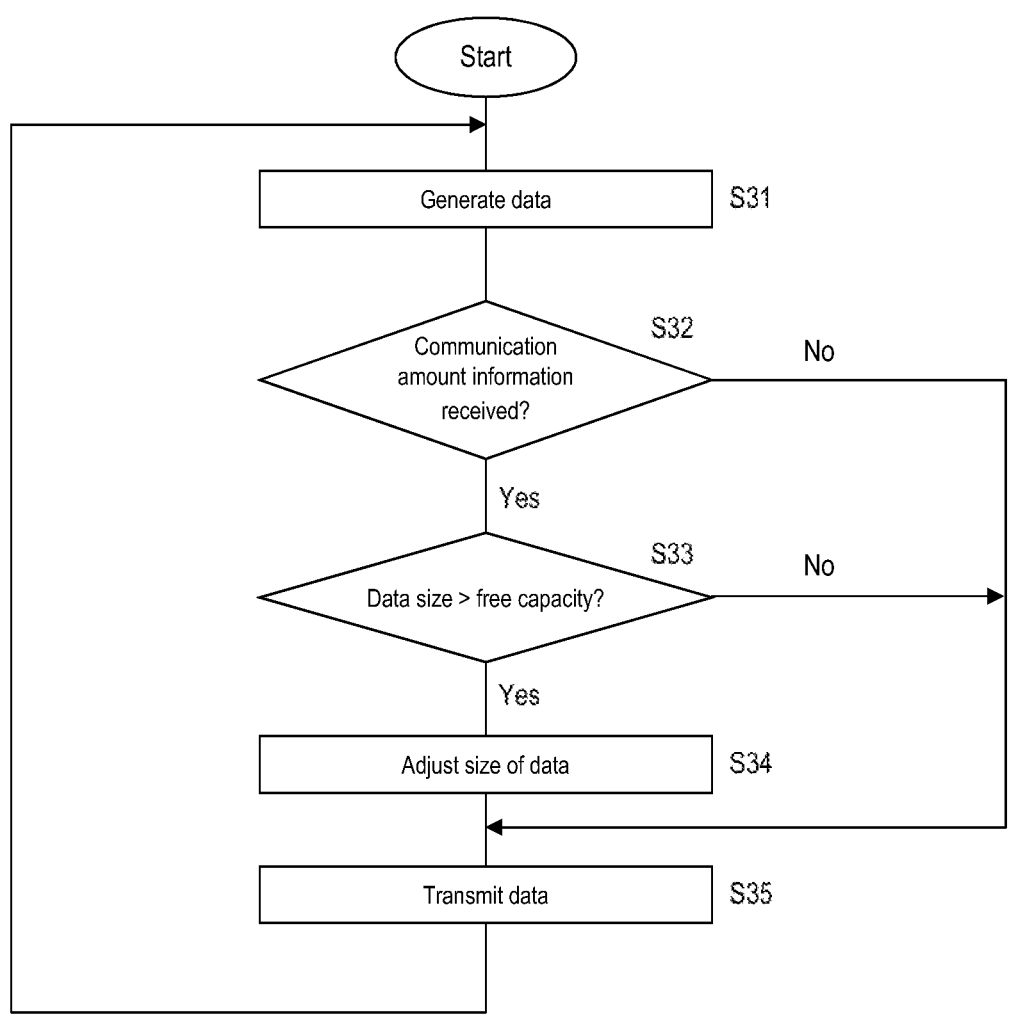
FIG. 10 is a flowchart showing a procedure of data transmission processing performed by the in-vehicle wireless communication device according to the present embodiment.

FIG. 10 is a flowchart showing a procedure of data transmission processing performed by the in-vehicle wireless communication device 1 according to the present embodiment. The processing unit 11 of the in-vehicle wireless communication device 1 according to the present embodiment generates data to be transmitted to the roadside wireless communication device 2 based on, for example, an image captured by the camera 5, a processing result of the ECU 6, or the like (step S31). The wireless communication processing unit 11b of the processing unit 11 determines whether or not the communication amount information transmitted by the roadside wireless communication device 2 has been received (step S32).

If the communication amount information has been received (S32: YES), the wireless communication processing unit 11b determines whether or not the data size of the data generated in step S31 exceeds the free capacity based on the communication amount information (step S33). If the data size exceeds the free capacity (S33: YES), the data size adjustment unit 11d of the processing unit 11 adjusts the size of the data by compressing the data to be transmitted (step S34). The wireless communication processing unit 11b transmits the size-adjusted data to the roadside wireless communication device 2 (step S35), and returns the processing to step S31.

If the traffic information has not been received from the roadside wireless communication device 2 (S32: NO), or if the data size of the data to be transmitted does not exceed the free capacity (S33: NO), the wireless communication processing unit 11b transmits the data generated in S31 to the roadside wireless communication device 2 (step S35) without adjusting the size, and returns the processing to step S31.

Modified Examples

Figure 11:
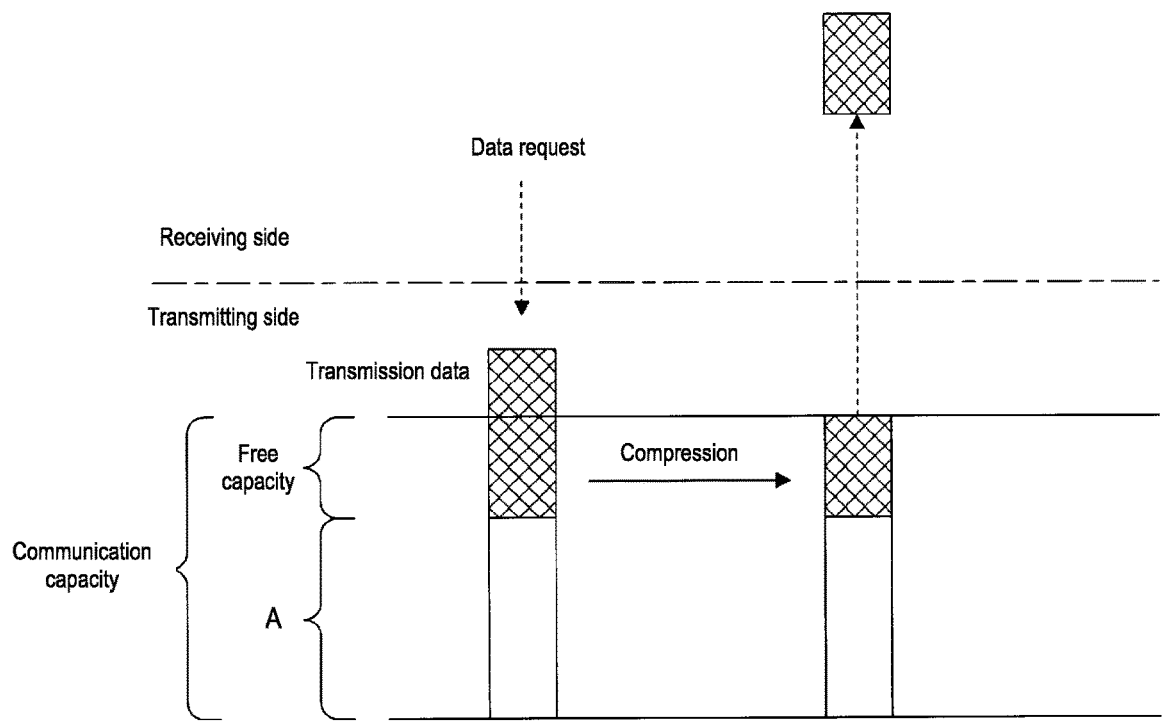
FIG. 11 is a schematic diagram for illustrating data transmission processing performed in a wireless communication system according to a modified example.

FIG. 11 is a schematic diagram for illustrating data transmission processing performed in the wireless communication system according to a modified example. In the wireless communication system according to the modified example, the device on the data transmitting side compresses the data to be transmitted according to its own communication amount. Note that in Modified Example 1, the device on the data transmitting side is referred to as the in-vehicle wireless communication device 1, and the device on the data receiving side is referred to as the roadside wireless communication device 2, but the same applies even if the reverse is true. The roadside wireless communication device 2, which is a device on the data receiving side, specifies the type and the like of data required for its own processing, and transmits a request for this data to the in-vehicle wireless communication device 1. The in-vehicle wireless communication device 1, which is a device on the data transmitting side, attempts to generate data corresponding to a request from the roadside wireless communication device 2.

For example, if the roadside wireless communication device 2 requests transmission of image data captured by the camera 5 by designating a resolution or frame rate and there is not enough free capacity left in the vehicle network 4 to transmit and receive this image data, there is a risk that image data cannot be transmitted from the camera 5 to the in-vehicle wireless communication device 1 via the in-vehicle network 4. In view of this, the in-vehicle wireless communication device 1 according to the modified example controls the operation of the camera 5 so as to compress the size of the image data by reducing the resolution or the frame rate. The in-vehicle wireless communication device 1 acquires the compressed image data from the camera 5 via the in-vehicle network 4, and transmits this image data to the roadside wireless communication device 2.

Figure 12:
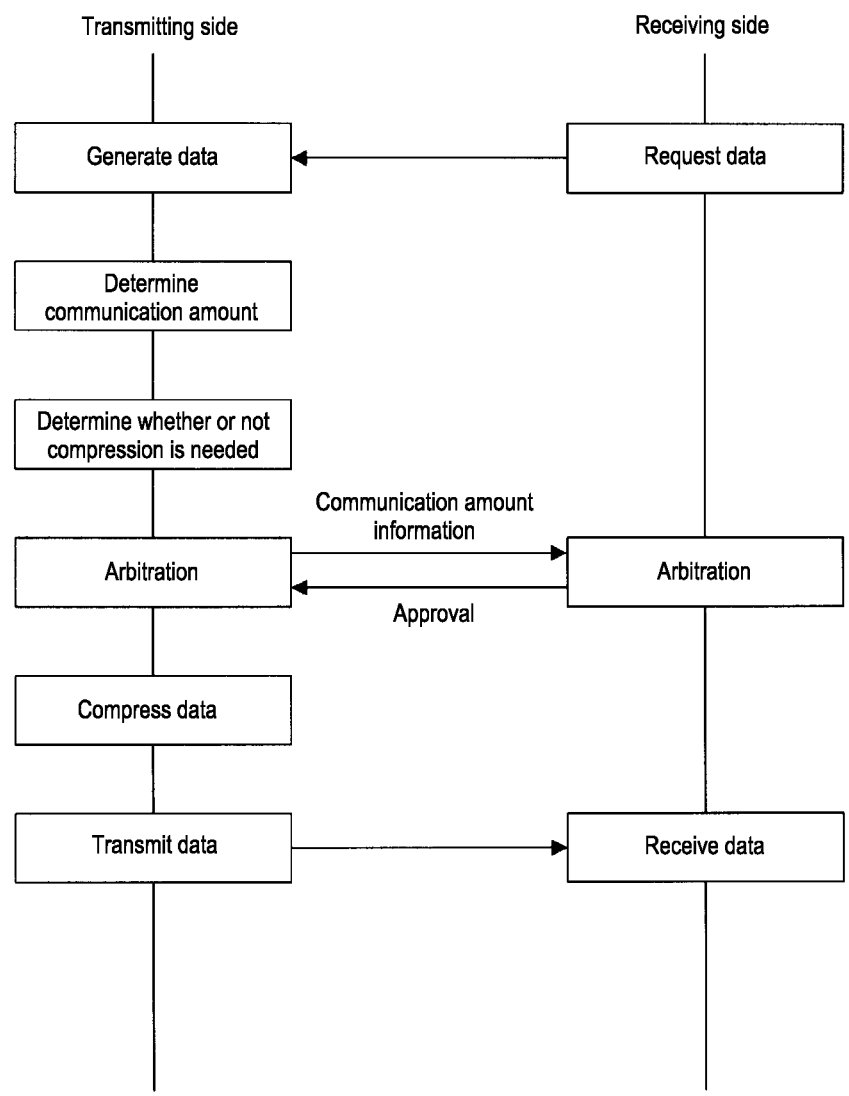
FIG. 12 is a schematic diagram for illustrating data transmission processing performed in a wireless communication system according to a modified example.

FIG. 12 is a schematic diagram for illustrating data transmission processing performed in the wireless communication system according to the modified example. The roadside wireless communication device 2, which is a device on the data receiving side, requests the in-vehicle wireless communication device 1 for the data needed for its own processing. The in-vehicle wireless communication device 1, which is a device on the data transmitting side, attempts to generate data corresponding to the request from the roadside wireless communication device 2. Here, the in-vehicle wireless communication device 1 determines the communication amount of the in-vehicle network 4, compares the determined communication amount and the data size of the requested data, and determines whether or not the requested data needs to be compressed.

If it is determined that data compression is needed, in the example shown in FIG. 12, the in-vehicle wireless communication device 1 performs arbitration processing with the roadside wireless communication device 2 to obtain approval for compressing the data. In the arbitration processing, for example, the in-vehicle wireless communication device 1 transmits information such as the communication amount information and the data compression rate to the roadside wireless communication device 2, and the roadside wireless communication device 2 notifies the in-vehicle wireless communication device 1 that the data compression is approved. Note that if approval is not obtained, the in-vehicle wireless communication device 1 does not compress the data, but the data cannot be transmitted due to this, and there is a possibility that there will be a lack of data transmitted from the in-vehicle wireless communication device 1 to the roadside wireless communication device 2 or the like.

If the approval of data compression is obtained through the arbitration processing, the in-vehicle wireless communication device 1 compresses the requested data and transmits the compressed data to the roadside wireless communication device 2. The roadside wireless communication device 2 receives the data compressed by the in-vehicle wireless communication device 1 and uses it for its own processing.

Data Transmission Stop Processing

Figure 13:
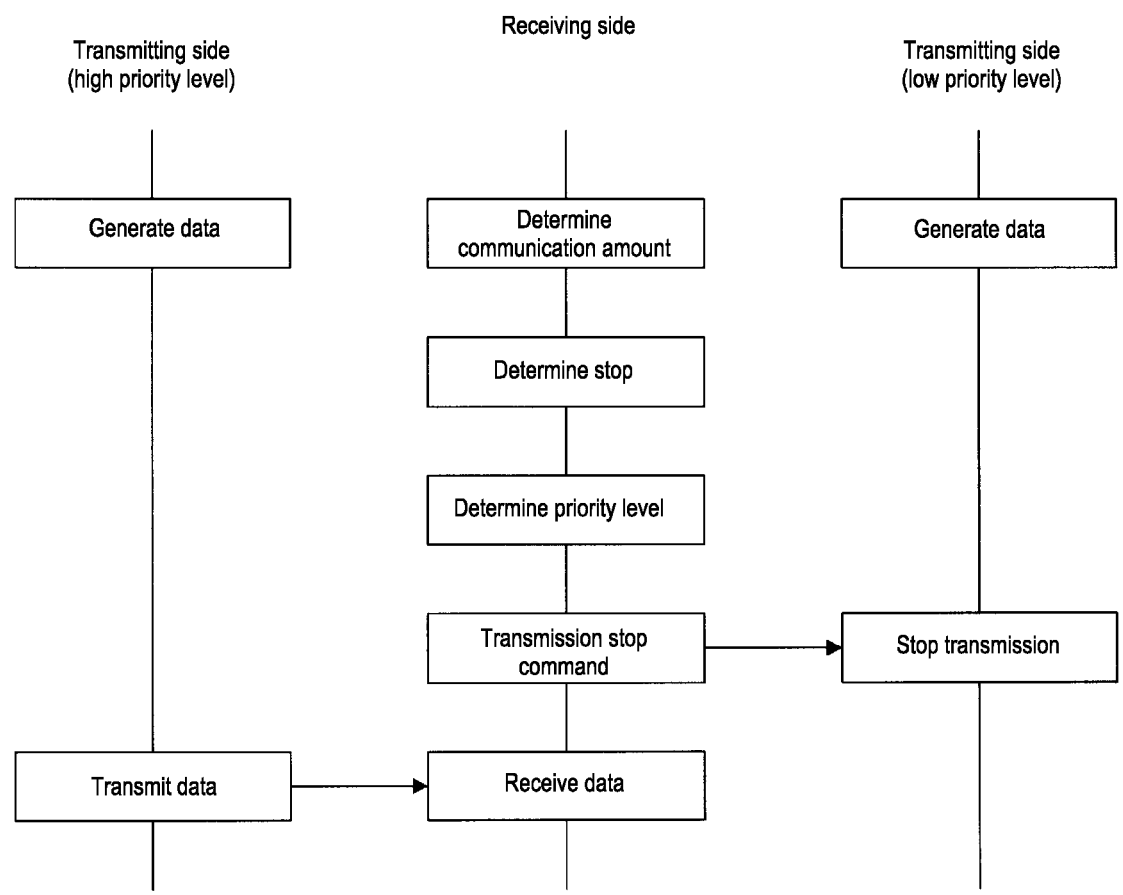
FIG. 13 is a schematic diagram for illustrating data transmission stop processing performed in the wireless communication system according to the present embodiment.

FIG. 13 is a schematic diagram for illustrating data transmission stop processing performed in the wireless communication system according to the present embodiment. Note that in the following description, the device on the data transmitting side will be referred to as a "roadside wireless communication device 2", and the device on the data receiving side will be referred to as an "in-vehicle wireless communication device 1", but the same applies even if the reverse is true. In the wireless communication system according to the present embodiment, one in-vehicle wireless communication device 1 can communicate wirelessly with a plurality of roadside wireless communication devices 2 in some cases, depending on the position of the vehicle 101, the position of the traffic signal 102, the radio wave condition of the surrounding area, and the like. In such a situation, if data is transmitted from a plurality of roadside wireless communication devices 2 to one in-vehicle wireless communication device 1, the amount of data received by the in-vehicle wireless communication device 1 increases, and there is a risk that the received data cannot be handled in the in-vehicle network 4.

In view of this, in the wireless communication system according to the present embodiment, it is possible to give a command to stop data transmission from the device on the data receiving side to the device on the data transmitting side. The example shown in FIG. 13 is a case where one in-vehicle wireless communication device 1 receives data from two roadside wireless communication devices 2. The in-vehicle wireless communication device 1 determines the communication amount of the in-vehicle network 4, and determines whether or not to give a stop command for data transmission, for example, depending on whether or not the communication amount exceeds a predetermined threshold value.

If it is determined that the communication amount exceeds the threshold value and the data transmission stop command is given, the in-vehicle wireless communication device 1 determines the priority level of the plurality of roadside wireless communication devices 2 capable of wireless communication. The in-vehicle wireless communication device 1 gives a data transmission stop command to the roadside wireless communication device 2 determined to have a low priority level.

The low-priority-level roadside wireless communication device 2 stops the transmission of data to the in-vehicle wireless communication device 1 if a stop command has been given from the in-vehicle wireless communication device 1. The high-priority-level roadside wireless communication device 2 to which the stop command has not been given continuously transmits data to the in-vehicle wireless communication device 1.

Note that the in-vehicle wireless communication device 1 may determine the priority levels of the plurality of roadside wireless communication devices 2 according to, for example, the type of data transmitted by each roadside wireless communication device 2, may determine the priority levels of the plurality of roadside wireless communication devices 2 according to, for example, the positional relationship, the distance, and the like between the vehicle 101 and the roadside wireless communication device 2, or may determine the priority level by a criterion other than these. The in-vehicle wireless communication device 1 may determine the priority levels of the plurality of roadside wireless communication devices 2 through any method.

Also, in this example, two roadside wireless communication devices 2 transmit data to one in-vehicle wireless communication device 1, but three or more roadside wireless communication devices 2 may also transmit data to one in-vehicle wireless communication device 1. In this case, the in-vehicle wireless communication device 1 assigns priority levels from first priority to third priority to the three or more roadside wireless communication devices 2, and for example, gives a data transmission stop command to the one roadside wireless communication device 2 having the lowest priority level, or gives data transmission stop commands to the two roadside wireless communication devices 2 with the lower priority levels. The in-vehicle wireless communication device 1 may determine how many of the plurality of roadside wireless communication devices 2 are to be given a stop command according to, for example, the communication amount of the in-vehicle network 4, or based on other factors. Also, the in-vehicle wireless communication device 1 may have a configuration capable of giving a command to cancel the transmission stop and resume the data transmission to the roadside wireless communication device 2 to which the data transmission stop command has been given.

Also, similarly to the case where one roadside wireless communication device 2 is capable of wireless communication with a plurality of in-vehicle wireless communication devices 1, the roadside wireless communication device 2 can determine the amount of communication and the priority levels, and can give a data transmission stop command to the in-vehicle wireless communication device 1.

Also, regarding a case where one roadside wireless communication device 2 is capable of wireless communication with a plurality of in-vehicle wireless communication devices 1, the roadside wireless communication device 2 may determine the communication amount and the priority levels, and may stop data transmission to the in-vehicle wireless communication devices 1. For example, the closer an in-vehicle wireless communication device 1 of a vehicle is located to the center of the intersection where the roadside wireless communication device 2 is installed, the higher its priority level is. By stopping the data transmission to the in-vehicle wireless communication device 1 of a low-priority-level vehicle located far from the intersection, the increase in the amount of data transmitted and received between the road and the vehicle is suppressed, and it is possible to continue the data transmission from the roadside wireless communication device 2 to the in-vehicle wireless communication device of the vehicle entering the intersection. Also, as another method for setting the priority levels, the priority level may be set higher for an in-vehicle wireless communication device 1 of a vehicle having a higher vehicle speed. By stopping the data transmission to the in-vehicle wireless communication device 1 of the low-speed vehicle, the increase in the amount of data transmitted and received between the road and the vehicle can be suppressed, and it is possible to continue data transmission from the roadside wireless communication device 2 to the in-vehicle wireless communication device of the high-speed vehicle.

Also, both the above-mentioned data transmission processing and the data transmission stop processing may be performed by one device. For example, the in-vehicle wireless communication device 1 can give a data transmission stop command to the roadside wireless communication device 2 having a low priority level, can transmit communication amount information to the roadside wireless communication device 2 having a high priority level, and can receive data with a compressed data size.

Figure 14:
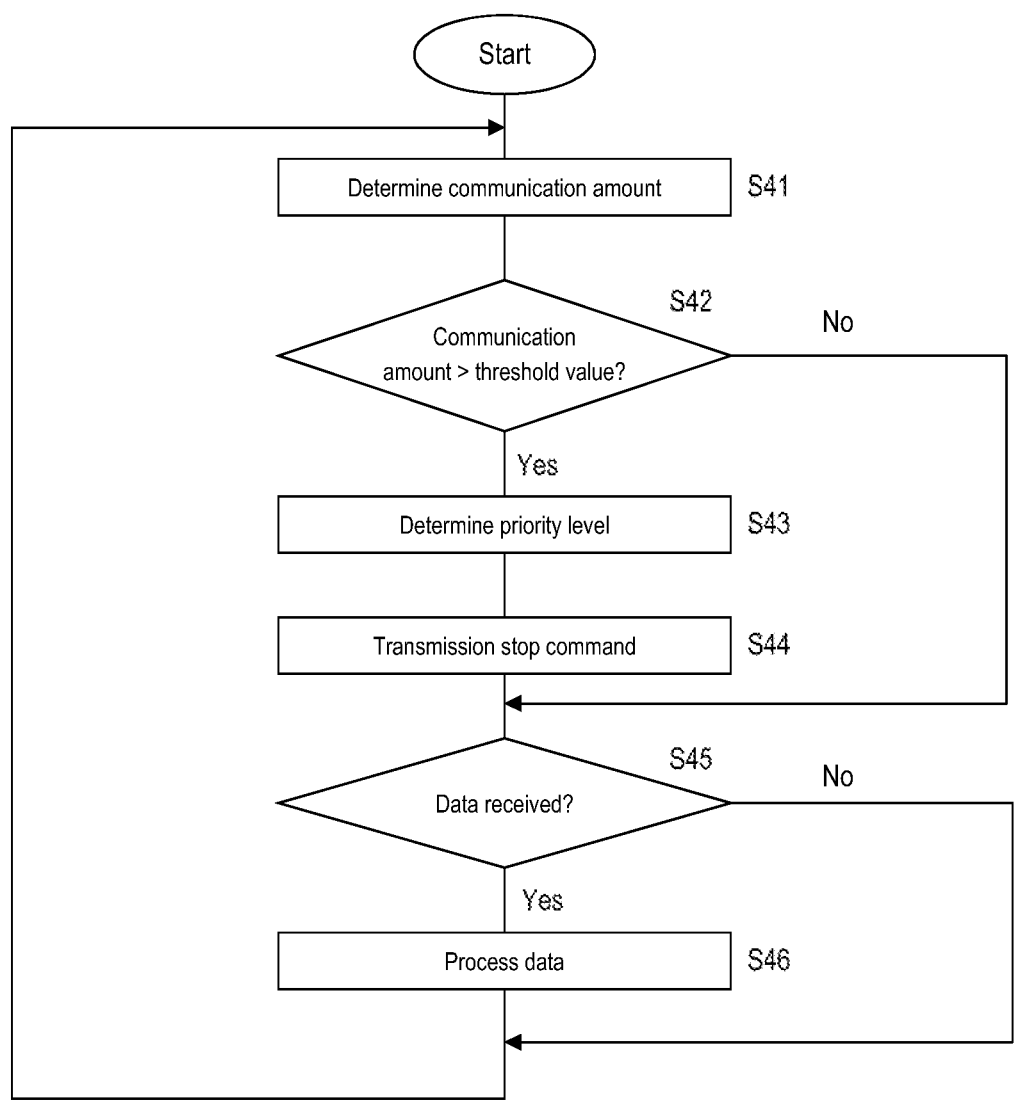
FIG. 14 is a flowchart showing a procedure of data transmission stop processing performed by the in-vehicle wireless communication device according to the present embodiment.

FIG. 14 is a flowchart showing a procedure of data transmission stop processing performed by the in-vehicle wireless communication device 1 according to the present embodiment. The communication amount determination unit 11a of the processing unit 11 of the in-vehicle wireless communication device 1 according to the present embodiment determines the communication amount of the in-vehicle network 4 (step S41). The processing unit 11 determines whether or not the communication amount determined in step S41 exceeds a predetermined threshold value (step S42). If the communication amount does not exceed the threshold value (S42: NO), the processing unit 11 proceeds to step S45.

If the communication amount exceeds the threshold value (S42: YES), the priority level determination unit 11e of the processing unit 11 determines the priority levels of the plurality of roadside wireless communication devices 2 capable of wireless communication at that time (step S43). The stop request unit 11f of the processing unit 11 gives a data transmission stop command to the roadside wireless communication device 2 having a low priority level based on the priority levels determined in step S43 (step S44), and advances the processing to step S45.

The wireless communication processing unit 11b of the processing unit 11 determines whether or not the data transmitted wirelessly from the roadside wireless communication device 2 has been received (step S45). If the data has been received (S45: YES), the wireless communication processing unit 11b performs data processing such as relaying the received data to the in-vehicle device (step S46), and returns the processing to step S41. If no data has been received (S45: NO), the processing unit 11 returns the processing to step S41.

Figure 15:
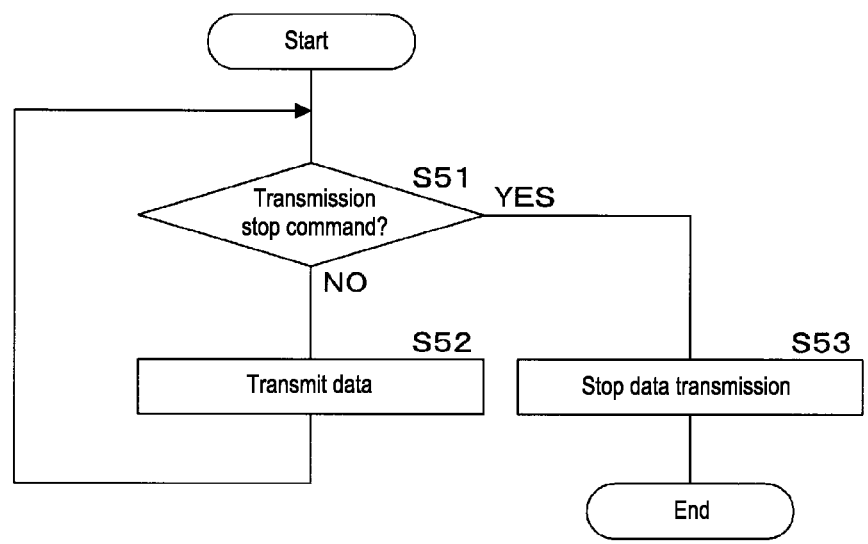
FIG. 15 is a flowchart showing a procedure of data transmission stop processing performed by the roadside wireless communication device according to the present embodiment.

FIG. 15 is a flowchart showing a procedure of data transmission stop processing performed by the roadside wireless communication device 2 according to the present embodiment. The wireless communication processing unit 21b of the processing unit 21 of the roadside wireless communication device 2 according to the present embodiment determines whether or not a data transmission stop command has been received from the in-vehicle wireless communication device 1 (step S51). If the stop command has not been received (S51: NO), the wireless communication processing unit 21b transmits data to the in-vehicle wireless communication device 1 (step S52), and returns the processing to step S51. If the stop command has been received (S51: YES), the wireless communication processing unit 21*b* stops the data transmission to the in-vehicle wireless communication device 1, which is the transmission source of the stop command (step S53), and ends the processing.

Note that the processing performed in the case where the command to stop the data transmission from the in-vehicle wireless communication device 1 to the roadside wireless communication device 2 is given from the roadside wireless communication device 2 to the in-vehicle wireless communication device 1 is not shown in the illustration of the flowchart.

Figure 16:
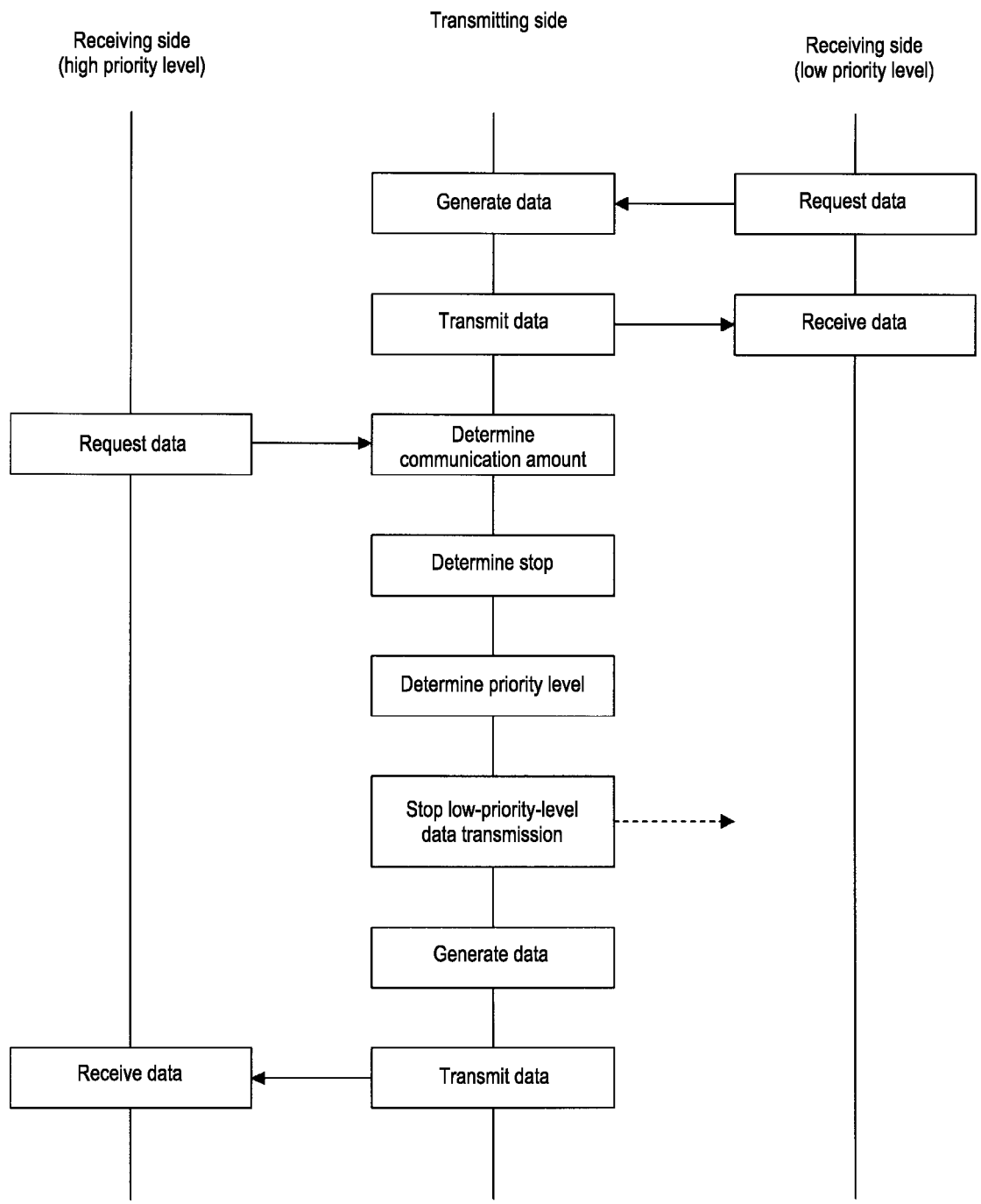
FIG. 16 is a schematic diagram for illustrating data transmission stop processing performed in the wireless communication system according to the present embodiment.

FIG. 16 is a schematic diagram for illustrating the data transmission stop processing performed in the wireless communication system according to the present embodiment. FIG. 16 shows an example of a case in which, if one in-vehicle wireless communication device 1 transmits data to a plurality of roadside wireless communication devices 2, the in-vehicle wireless communication device 1 itself stops data transmission to a low-priority-level roadside wireless communication device 2. Note that in the following, the device on the data transmitting side will be referred to as an in-vehicle wireless communication device 1, and the device on the data receiving side will be referred to as a roadside wireless communication device 2, but the same applies even if the reverse is true. In the wireless communication system according to the present embodiment, one in-vehicle wireless communication device 1 can communicate wirelessly with a plurality of roadside wireless communication devices 2 in some cases, depending on the position of the vehicle 101, the position of the traffic signal 102, the radio wave condition of the surrounding area, and the like. In such a situation, if a request for data transmission from a plurality of roadside wireless communication devices 2 to one in-vehicle wireless communication device 1 is given, there is a risk that the requested data cannot be handled in the in-vehicle network 4 of the vehicle 101 in which the in-vehicle wireless communication device 1 is mounted.

In view of this, in the wireless communication system according to the present embodiment, if a data request is given from a plurality of devices on the data receiving side to the device on the data transmitting side, the device on the transmitting side can stop transmission of the data according to the priority level of the device on the receiving side. In the example shown in FIG. 16, a data request is first given from one roadside wireless communication device 2 to the in-vehicle wireless communication device 1. Upon receiving the data request, the in-vehicle wireless communication device 1 generates the requested data and transmits the generated data to the roadside wireless communication device 2 that is the request source. The roadside wireless communication device 2 that is the request source can receive the data transmitted by the in-vehicle wireless communication device 1 in response to the request.

Thereafter, if a data request is given from another roadside wireless communication device 2 to the in-vehicle wireless communication device 1, the in-vehicle wireless communication device 1 is given a data request from a plurality of roadside wireless communication devices 2, and therefore the in-vehicle wireless communication device 1 determines the communication amount of the in-vehicle network 4. The in-vehicle wireless communication device 1 determines whether or not to stop data transmission, for example, depending on whether or not the communication amount of the in-vehicle network 4 exceeds the threshold value. If it has been determined that the communication amount exceeds the threshold value and the data transmission is to be stopped, the in-vehicle wireless communication device 1 determines the priority levels of the plurality of roadside wireless communication devices 2 that requested the data. The in-vehicle wireless communication device 1 stops data transmission to the roadside wireless communication device 2 determined to have a low priority level. As a result, the low-priority-level roadside wireless communication device 2 cannot receive the data from the in-vehicle wireless communication device 1. The in-vehicle wireless communication device 1 generates the requested data and transmits the generated data to the roadside wireless communication device 2 determined to have a high priority level. The high-priority-level roadside wireless communication device 2 can receive data transmitted from the in-vehicle wireless communication device 1.

The in-vehicle wireless communication device 1 may determine the priority levels of the plurality of roadside wireless communication devices 2 according to, for example, the type of data to be transmitted to each roadside wireless communication device 2, may determine the priority levels according to, for example, the positional relationship, the distance, or the like between the vehicle 101 and the roadside wireless communication device 2, and may determine the priority levels according to a criterion other than these. The in-vehicle wireless communication device 1 may determine the priority levels of the plurality of roadside wireless communication devices 2 through any method.

Also, in this example, although it was assumed that one in-vehicle wireless communication device 1 transmits data to two roadside wireless communication devices 2, one in-vehicle wireless communication device 1 may also transmit data to three or more roadside wireless communication devices 2. In this case, the in-vehicle wireless communication device 1 assigns priority levels from first priority to third priority to the three or more roadside wireless communication devices 2, and for example, stops data transmission to the one roadside wireless communication device 2 having the lowest priority level, or stops data transmission to the two roadside wireless communication devices 2 with the lower priority levels. The in-vehicle wireless communication device 1 may also determine how many of the plurality of roadside wireless communication devices 2 to stop data transmission for according to, for example, the communication amount of the in-vehicle network 4, or based on other factors. Also, the in-vehicle wireless communication device 1 may have a configuration capable of canceling the transmission stop and resuming the data transmission with respect to the roadside wireless communication device 2 that has stopped the data transmission.

Also, similarly to the case where one roadside wireless communication device 2 transmits data to a plurality of in-vehicle wireless communication devices 1, the roadside wireless communication device 2 can determine the communication amount and the priority levels, and stop data transmission to the in-vehicle wireless communication device 1.

Figure 17:
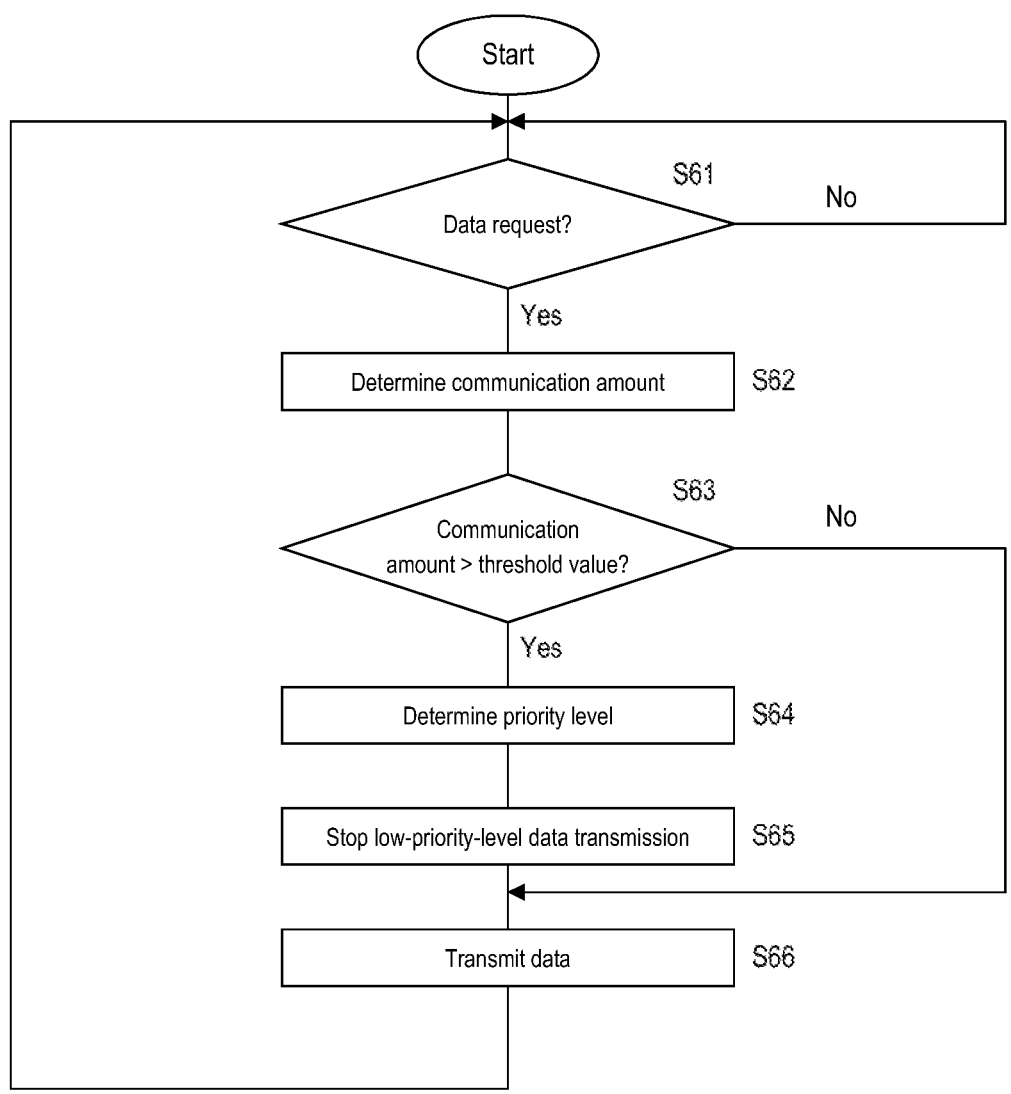
FIG. 17 is a flowchart showing a procedure of data transmission stop processing performed by the in-vehicle wireless communication device according to the present embodiment.

FIG. 17 is a flowchart showing a procedure of data transmission stop processing performed by the in-vehicle wireless communication device 1 according to the present embodiment. The wireless communication processing unit 11*b* of the processing unit 11 of the in-vehicle wireless communication device 1 according to the present embodiment determines whether or not a data request has been given from the roadside wireless communication device 2

(step S61). If no data request has been given (S61: NO), the wireless communication processing unit 11b waits until the data request is given.

If a data request has been given from the roadside wireless communication device 2 (S61: YES), the communication amount determination unit 11a of the processing unit 11 determines the communication amount of the in-vehicle network 4 (step S62). The processing unit 11 determines whether or not the communication amount determined in step S62 exceeds a predetermined threshold value (step S63). If the communication amount does not exceed the threshold value (S63: NO), the processing unit 11 advances the processing to step S66.

If the communication amount exceeds the threshold value (S63: YES), the priority level determination unit 11e of the processing unit 11 determines the priority level of the plurality of roadside wireless communication devices 2 that are data request sources at that time (step S64). Based on the priority levels determined in step S64, the processing unit 11 stops data transmission to the roadside wireless communication device 2 having a lower priority level (step S65), and advances the processing to step S66.

Thereafter, the wireless communication processing unit 11b of the processing unit 11 transmits the data requested from the roadside wireless communication device 2 to the roadside wireless communication device 2 that is the request source (step S66), and returns the processing to step S61.

SUMMARY

The in-vehicle wireless communication device 1 according to the present embodiment having the above configuration determines the communication amount in the in-vehicle network 4 of the vehicle 101. The in-vehicle wireless communication device 1 wirelessly transmits information relating to the determined communication amount to the roadside wireless communication device 2 provided outside the vehicle 101 as communication amount information. As a result, the roadside wireless communication device 2 can keep track of and predict the communication status in the in-vehicle network 4 of the vehicle 101 to which data is to be transmitted based on the communication amount information from the in-vehicle wireless communication device 1 and the like, and can compress the data size to, for example, a size suitable for the free capacity of the communication of the in-vehicle network 4 or the like, and transmit the result to the in-vehicle wireless communication device 1. The in-vehicle wireless communication device 1 can receive data transmitted from the roadside wireless communication device 2 at a size corresponding to the transmitted communication amount information, and can be used for processing in the vehicle 101. Due to the in-vehicle wireless communication device 1 transmitting the communication amount information, the roadside wireless communication device 2 can transmit data of an appropriate size.

Also, the roadside wireless communication device 2 determines the communication amount of wireless communication performed with one or a plurality of vehicles 101, and transmits the communication amount information relating to the determined communication amount to the in-vehicle wireless communication device 1. The in-vehicle wireless communication device 1 that has received the communication amount information from the roadside wireless communication device 2 adjusts the data size by, for example, compressing the data size to a size suitable for the free capacity of the wireless communication of the roadside wireless communication device 2, and transmits the data with the adjusted size to the roadside wireless communication device 2. The roadside wireless communication device 2 can receive the data transmitted from the in-vehicle wireless communication device 1 at a size corresponding to the transmitted communication amount information and use the data for its own processing. Due to the roadside wireless communication device 2 transmitting the communication amount information, the in-vehicle wireless communication device 1 can transmit data of an appropriate size.

Also, the in-vehicle wireless communication device 1 receives a data request from the roadside wireless communication device 2, adjusts the size of the data according to the request, and transmits the resulting data to the roadside wireless communication device 2. As a result, the roadside wireless communication device 2 can request the in-vehicle wireless communication device 1 for the data necessary for its own processing, and can receive the data corresponding to the request at an appropriate data size.

Also, the in-vehicle wireless communication device 1 requests the stop of data transmission to the roadside wireless communication device 2 according to the determined communication amount of the in-vehicle network 4. As a result, the in-vehicle wireless communication device 1 can be expected to prevent data of an amount that cannot be handled in the in-vehicle network 4 from being transmitted from the roadside wireless communication device 2.

Also, if there are a plurality of roadside wireless communication device 2 that can perform wireless communication, the in-vehicle wireless communication device 1 determines the priority levels of the plurality of roadside wireless communication devices 2, and requests stopping of data transmission to the roadside wireless communication device 2 that was determined to have a low priority level. As a result, it can be expected that the in-vehicle wireless communication device 1 will reliably receive the data transmitted by the high-priority-level roadside wireless communication device 2, and suppress an increase in the communication amount due to the data transmitted by the low-priority-level roadside wireless communication device 2.

Each device in a wireless communication system includes a computer including a microprocessor, ROM, RAM, and the like. The computation processing devices such as microprocessors may respectively read out and execute computer programs including some or all of the steps of the sequence charts or flowcharts, such as FIGS. 6 to 10 and 12 to 17, from storage units such as a ROM and RAM. The computer programs of this plurality of devices can be respectively installed from an external server device or the like. Also, the computer programs of this plurality of devices are respectively distributed in a state of being stored in a recording medium such as a CD-ROM, a DVD-ROM, or a semiconductor memory.

The embodiments disclosed herein are to be considered exemplary in all respects and not limiting. The scope of the present disclosure is expressed not by the above-described meaning but by the claims, and is intended to include all modifications within the meaning and scope equivalent to the claims.

The invention claimed is:

1. An in-vehicle wireless communication device that is mounted in a vehicle and includes a wireless communication unit for performing wireless communication with an external device installed outside of the vehicle and a processing unit for performing processing relating to communication, wherein the processing unit
  determines a communication amount in an in-vehicle network provided inside of the vehicle,
  transmits communication amount information relating to the determined communication amount to the external device by the wireless communication unit,
  receives data transmitted from the external device at a size corresponding to the transmitted communication amount information, by the wireless communication unit, and
  if the determined communication amount exceeds a threshold value, requests stopping of transmission of data to the external device.

2. The in-vehicle wireless communication device according to claim 1, wherein the processing unit:
  receives the communication amount information relating to the communication amount in wireless communication performed with the vehicle by the external device, from the external device,
  adjusts the size of the data to be transmitted to the external device according to the received communication amount information, and
  transmits the data with the adjusted size to the external device by the wireless communication unit.

3. The in-vehicle wireless communication device according to claim 2, wherein if there are a plurality of external devices with which the wireless communication unit can communicate, the processing unit determines priority levels of the plurality of external devices, and
  the processing unit requests stopping of transmission of data to the external device determined to have a low priority level.

4. The in-vehicle wireless communication device according to claim 2, wherein the processing unit:
  receives a request for data from the external device by the wireless communication unit,
  adjusts the size of the data corresponding to the received request, and
  transmits image data with the adjusted size to the external device by the wireless communication unit.

5. The in-vehicle wireless communication device according to claim 4, wherein if there are a plurality of external devices with which the wireless communication unit can communicate, the processing unit determines priority levels of the plurality of external devices, and
  the processing unit requests stopping of transmission of data to the external device determined to have a low priority level.

6. The in-vehicle wireless communication device according to claim 1, wherein if there are a plurality of external devices with which the wireless communication unit can communicate, the processing unit determines priority levels of the plurality of external devices, and
  the processing unit requests stopping of transmission of data to the external device determined to have a low priority level.

7. A wireless communication system by which an in-vehicle wireless communication device and an external device perform wireless communication with each other, the in-vehicle wireless communication device being mounted in a vehicle and including a wireless communication unit for performing wireless communication with the outside of the vehicle and a processing unit for performing processing relating to communication, and the external device being installed outside of the vehicle and including a wireless communication unit for performing wireless communication with the vehicle and a processing unit for performing processing relating to communication,
  wherein the processing unit of the in-vehicle wireless communication device determines a communication amount in an in-vehicle network provided inside of the vehicle and transmits communication amount information relating to the determined communication amount to the external device,
  the processing unit of the external device receives the communication amount information transmitted by the in-vehicle wireless communication device, adjusts the size of the data to be transmitted to the in-vehicle wireless communication device according to the received communication amount information, and transmits the data with the adjusted size to the in-vehicle wireless communication device,
  the processing unit of the in-vehicle wireless communication device receives the data transmitted by the external device at a size corresponding to the communication amount information,
  if the determined communication amount exceeds a threshold value, the processing unit of the in-vehicle wireless communication device requests stopping of transmission of data to the external device, and
  the processing unit of the external device stops transmission of data to the in-vehicle wireless communication device that gave the request, in response to the request.

8. A wireless communication method by which an in-vehicle wireless communication device mounted in a vehicle and an external device installed outside of the vehicle perform wireless communication with each other,
  wherein the in-vehicle wireless communication device determines a communication amount in an in-vehicle network provided inside of the vehicle and transmits communication amount information relating to the determined communication amount to the external device,
  the external device receives the communication amount information transmitted by the in-vehicle wireless communication device, adjusts the size of data to be transmitted to the in-vehicle wireless communication device according to the received communication amount information, and transmits the data with the adjusted size to the in-vehicle wireless communication device,
  the in-vehicle wireless communication device receives the data transmitted by the external device at a size corresponding to the communication amount information, and
  if the determined communication amount exceeds a threshold value, the in-vehicle wireless communication device requests stopping of transmission of data to the external device.

* * * * *